(12) United States Patent
Wu et al.

(10) Patent No.: US 10,798,656 B2
(45) Date of Patent: Oct. 6, 2020

(54) INFORMATION TRANSMISSION APPARATUS AND METHOD AND COMMUNICATION SYSTEM

(71) Applicant: FUJITSU LIMITED, Kawasaki-shi, Kanagawa (JP)

(72) Inventors: Lianhai Wu, Beijing (CN); Hua Zhou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 28 days.

(21) Appl. No.: 16/173,777

(22) Filed: Oct. 29, 2018

(65) Prior Publication Data

US 2019/0069247 A1    Feb. 28, 2019

Related U.S. Application Data

(63) Continuation of application No. PCT/CN2016/082017, filed on May 13, 2016.

(51) Int. Cl.
*H04W 52/02* (2009.01)
*H04W 88/04* (2009.01)
(Continued)

(52) U.S. Cl.
CPC ......... *H04W 52/0261* (2013.01); *H04W 4/80* (2018.02); *H04W 24/10* (2013.01); *H04W 76/11* (2018.02); *H04W 76/15* (2018.02); *H04W 88/04* (2013.01); *Y02D 70/126* (2018.01); *Y02D 70/14* (2018.01)

(58) Field of Classification Search
CPC ..... H04W 76/11; H04W 24/10; H04W 76/15; H04W 4/80; H04W 52/0261; H04W 88/04
See application file for complete search history.

(56) References Cited

U.S. PATENT DOCUMENTS 9,226,211 B2    12/2015    Yeh et al.
9,357,463 B2    5/2016    Bangolae et al.
(Continued)

FOREIGN PATENT DOCUMENTS

CN    104754575 A    7/2015
CN    104854916 A    8/2015
(Continued)

OTHER PUBLICATIONS

International Search Report issued by the State Intellectual Property Office of China for corresponding International Patent Application No. PCT/CN2016/082017, dated Jan. 25, 2017, with an English translation.
(Continued)

*Primary Examiner* — Chi Ho A Lee
(74) *Attorney, Agent, or Firm* — Myers Wolin, LLC.

(57) ABSTRACT

An information transmission apparatus and method and a communication system. The information transmission method includes: reporting information including an ID of a relay UE by a remote UE to a base station, the information further indicating that the remote UE supports sidelink communication and/or non-3GPP communication with the relay UE; and performing communication based on a communication link configured by the base station or a communication link selected by the remote UE. Hence, not only the UE may be made power-saving, but also continuity of data transmission may be kept.

20 Claims, 18 Drawing Sheets

(51) Int. Cl.
*H04W 76/15* (2018.01)
*H04W 4/80* (2018.01)
*H04W 76/11* (2018.01)
*H04W 24/10* (2009.01)

(56) References Cited

U.S. PATENT DOCUMENTS

| | | |
|---|---|---|
| 2014/0247759 A1 | 9/2014 | Zhang et al. |
| 2014/0269464 A1* | 9/2014 | Park ................ H04W 52/0274 370/311 |
| 2014/0307872 A1 | 10/2014 | Heo et al. |
| 2014/0378123 A1 | 12/2014 | Stojanovski et al. |
| 2015/0004969 A1 | 1/2015 | Han et al. |
| 2015/0009870 A1 | 1/2015 | Bashar et al. |
| 2015/0201374 A1 | 7/2015 | Yeh et al. |
| 2015/0215989 A1 | 7/2015 | Bangolae et al. |
| 2015/0223133 A1 | 8/2015 | Stojanovski et al. |
| 2015/0334152 A1 | 11/2015 | Oyman et al. |
| 2015/0341838 A1 | 11/2015 | Pinheiro et al. |
| 2015/0351076 A1* | 12/2015 | Pais ...................... H04W 76/14 370/312 |
| 2015/0351139 A1 | 12/2015 | Zhang et al. |
| 2016/0044613 A1* | 2/2016 | Cai ...................... H04W 56/00 370/315 |
| 2016/0183149 A1 | 6/2016 | Stojanovski et al. |
| 2016/0198343 A1 | 7/2016 | Heo et al. |
| 2016/0198398 A1 | 7/2016 | Chen et al. |
| 2016/0295565 A1* | 10/2016 | Kim ...................... H04W 76/14 |
| 2016/0309328 A1 | 10/2016 | Zhang et al. |
| 2017/0086114 A1* | 3/2017 | Jung ...................... H04W 36/08 |
| 2017/0230941 A1* | 8/2017 | Agiwal ................. H04W 72/04 |
| 2017/0295531 A1* | 10/2017 | Singh ...................... H04W 8/08 |
| 2018/0084560 A1* | 3/2018 | Cho ...................... H04W 12/08 |
| 2018/0109985 A1* | 4/2018 | Huang ................. H04W 76/20 |
| 2018/0206176 A1* | 7/2018 | Panteleev ............ H04B 17/318 |
| 2018/0220335 A1* | 8/2018 | Lee .................... H04W 52/0229 |
| 2018/0220480 A1* | 8/2018 | Agiwal ................ H04W 24/08 |
| 2018/0343701 A1* | 11/2018 | Ma ....................... H04W 88/06 |

FOREIGN PATENT DOCUMENTS

| | | |
|---|---|---|
| CN | 105208626 A | 12/2015 |
| CN | 105453656 A | 3/2016 |
| CN | 105611642 A | 5/2016 |

OTHER PUBLICATIONS

Written Opinion of the International Searching Authority issued by the State Intellectual Property Office of China for corresponding International Patent Application No. PCT/CN2016/082017, dated Jan. 25, 2017, with an English translation.

* cited by examiner

INFORMATION TRANSMISSION APPARATUS AND METHOD AND COMMUNICATION SYSTEM

CROSS REFERENCE TO RELATED APPLICATIONS

This application is a continuation application of International Application PCT/CN2016/082017 filed on May 13, 2016, the entire contents of which are incorporated herein by reference.

TECHNICAL FIELD

This disclosure relates to the field of communication technologies, and in particular to an information transmission apparatus and method and a communication system.

BACKGROUND

A sidelink communication mode refers to that a packet needs not to pass a core network and a base station, and a communication link may be directly established between user equipments (UEs) UE 1 and UE 2 for communication. The sidelink communication may also be referred to as device to device (D2D) communication. And a sidelink discovery procedure is generally performed before performing sidelink communication. For example, UE 1 needs first to discover whether UE 2 is near before transmitting information to UE 2 in the sidelink communication mode.

FIG. 1 is a schematic diagram of the sidelink communication, in which a case where two UEs (UE 1 and UE 2) under coverage of a base station (such as an eNB) perform sidelink discovery or establish sidelink communication is shown. FIG. 2 is another schematic diagram of the sidelink communication, in which a case where one UE (UE 1) under coverage of a base station and another UE (UE 2) not under the coverage of the base station perform sidelink discovery or establish sidelink communication is shown. And FIG. 3 is a further schematic diagram of the sidelink communication, in which a case where two UEs (UE 1 and UE 2) not under coverage of a base station perform sidelink discovery or establish sidelink communication is shown.

The sidelink communication mode may be used to expand coverage of a cell. Two examples of expanding coverage shall be given below with reference to FIGS. 1 and 2.

Scenario 1: as shown in FIG. 1, a UE (UE 2) is located at an edge of a cell, and its signals are relatively weak, which is very possible to leave coverage of the cell. Furthermore, there exists a UE (such as UE 1) nearby which is authorized by a network and has a function of relay. And in order to avoid traffic interruption, UE 2 may access to a base station via relay UE 1 after discovering the relay UE 1, and proceed with performing normal traffic communication.

Scenario 2: as shown in FIG. 2, a UE (such as UE 2) is located in an area with no network coverage, and there exists a UE (such as UE 1) nearby which is authorized by a network and has a function of relay. In order to access to a network for communication, UE 2 may access to a base station via relay UE 1 after discovering the relay UE 1 within coverage of a cell.

In the above-described scenarios, UE 2 may be referred to as a remote UE, which may be located within coverage of a cell, or may be located out of the coverage of the cell. And a UE having a function of relay (such as UE 1) may be referred to a relay UE, may be referred to as a UE-network relay, and may also be referred to as a relay.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

Embodiments of this disclosure provide an information transmission apparatus and method and a communication system, in which a non-3rd Generation Partnership Project (3GPP) communication technique (such as the Bluetooth technique or the WIFI technique is used between a remote UE and a relay UE for communication.

According to a first aspect of the embodiments of this disclosure, there is provided an information transmission method, including:

reporting information including an ID of a relay UE by a remote UE to a base station, the information further indicating that the remote UE supports sidelink communication and/or non-3GPP communication with the relay UE; and performing communication by the remote UE based on a communication link configured by the base station or a communication link selected by the remote UE.

According to a second aspect of the embodiments of this disclosure, there is provided an information transmission apparatus, configured in a remote UE, the information transmission apparatus including:

an information reporting unit configured to report information including an ID of a relay UE to a base station, the information further indicating that the remote UE supports sidelink communication and/or non-3GPP communication with the relay UE; and a data communication unit configured to perform communication based on a communication link configured by the base station or a communication link selected by the remote UE.

According to a third aspect of the embodiments of this disclosure, there is provided an information transmission method, including:

receiving, by a base station, information including an ID of a relay UE reported by a remote UE, the information further indicating that the remote UE supports sidelink communication and/or non-3GPP communication with the relay UE; and configuring by the base station that the remote UE and/or the relay UE use(s) one or more of a sidelink, a non-3GPP link and an air-interface link to communicate.

According to a fourth aspect of the embodiments of this disclosure, there is provided an information transmission apparatus, configured in a base station, the information transmission apparatus including:

an information receiving unit configured to receive information including an ID of a relay UE reported by a remote UE, the information further indicating that the remote UE supports sidelink communication and/or non-3GPP communication with the relay UE; and a link configuring unit configured to configure that the remote UE and/or the relay UE use(s) one or more of a sidelink, a non-3GPP link and an air-interface link to communicate.

According to a fifth aspect of the embodiments of this disclosure, there is provided a communication system, including:

a remote UE, including the information transmission apparatus as described in the second aspect;

a relay UE configured to communicate with the remote UE; and a base station including the information transmission apparatus as described in the fourth aspect.

An advantage of the embodiments of this disclosure exists in that the remote UE reports information including an ID of the relay UE to the base station, the information further indicating that the remote UE supports sidelink communication and/or non-3GPP communication with the relay UE; and the remote UE performs communication based on a communication link configured by the base station or a communication link selected by the remote UE.

Hence, not only the UE may be made power-saving, for example, the remote UE may perform data transmission with an adjacent relay UE without needing to enlarge power to communicate with a base station; but also continuity of data transmission may be kept, for example, when an air-interface issue occurs, the remote UE may select the non-3GPP technique to perform communication with the relay UE, thereby avoiding a problem of interruption during the transmission.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In this disclosure, a base station may be referred to as an access point, a broadcast transmitter, a node B, or an evolution node B (eNB), etc., and may include some or all functions of them. A term "base station" shall be used in the text, and each base station provides communication coverage for a specific geographical region. And a term "cell" may refer to a base station and/or its coverage area, which is dependent on a context of the term.

In this disclosure, a mobile station or equipment may be referred to as a user equipment (UE). The UE may be fixed or mobile, and may also be referred to as a mobile station, a terminal, an access terminal, a user unit, or a station, etc. The UE may be a cellular phone, a personal digital assistant (PDA), a wireless modem, a wireless communication device, a handhold device, a lap-top computer, a cordless telephone, and a wearable device, etc.

Figure 4:
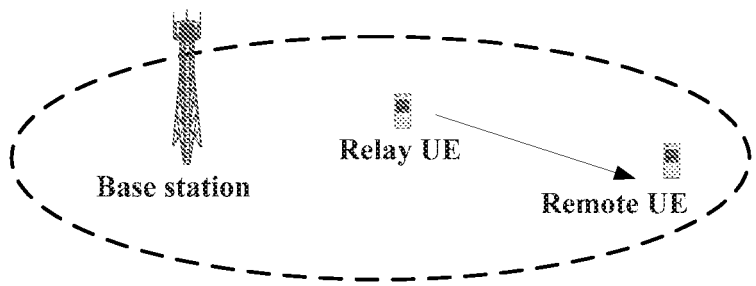
FIG. 4 is a schematic diagram of selecting/reselecting a relay UE by a remote UE.

FIG. 4 is a schematic diagram of selecting/reselecting a relay UE by a remote UE. As shown in FIG. 4, after the remote UE located in a cell coverage discovers and selects a relay UE, the remote UE will transmit information to inform a base station that it has selected the relay UE. After receiving the information, the base station will allocate one or more side link resources to the remote UE.

The remote UE may transmit a connection establishment request to the selected relay UE on the allocated resources. After receiving the information, the relay UE will transmit resource request signaling to the base station. After receiving the request information transmitted by the relay UE, the base station may possibly reject to allocate a resource to the relay UE based on consideration of shortage of resources. In such a case where the base station does not know that the remote UE and the relay UE are paired users, a situation will occur in which the base station allocates resources to the remote UE but does not allocate resources to the relay UE.

Embodiment 1

These embodiments of this disclosure provide an information transmission method.

Figure 5:
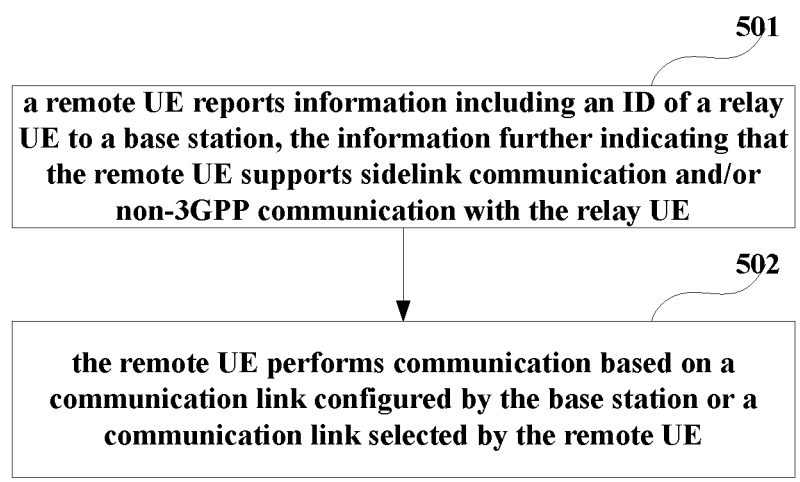
FIG. 5 is a schematic diagram of the information transmission method of Embodiment 1 of this disclosure.

FIG. 5 is a flowchart of the information transmission method of the embodiment of this disclosure, in which a situation at a remote UE side is shown. As shown in FIG. 5, the information transmission method includes:

Block 501: a remote UE reports information including an ID of a relay UE to a base station, the information further indicating that the remote UE supports sidelink communication and/or non-3GPP communication with the relay UE; and Block 502: the remote UE performs communication based on a communication link configured by the base station or a communication link selected by the remote UE.

Figure 1:
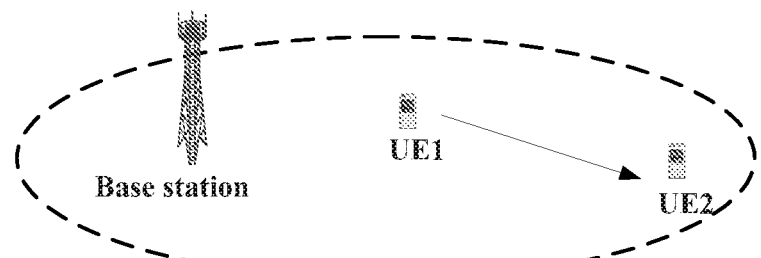
FIG. 1 is a schematic diagram of sidelink communication.
Figure 2:
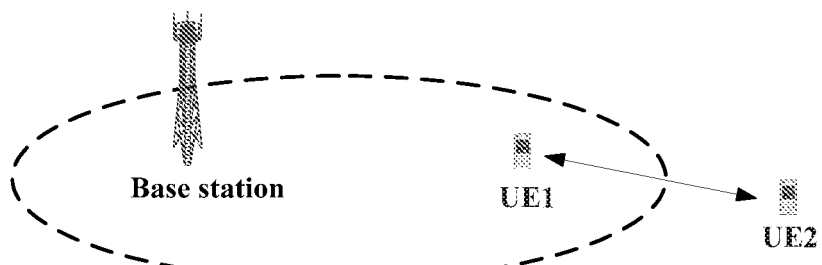
FIG. 2 is another schematic diagram of the sidelink communication.
Figure 3:
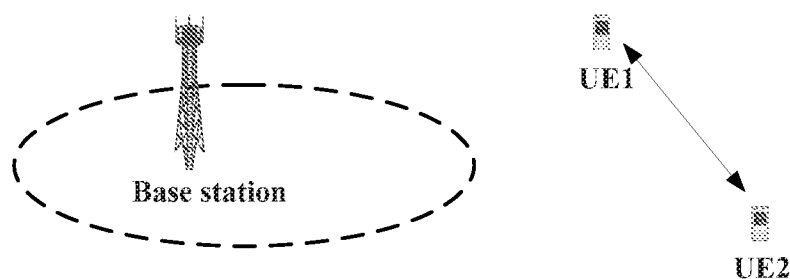
FIG. 3 is a further schematic diagram of the sidelink communication.

In an embodiment, it is applicable to the scenario shown in FIG. 1 or 4, and the remote UE and the relay UE are both within the coverage of the cell. The base station may be a macro base station (such as an eNB), and a macro cell generated by the macro base station may serve the user equipment; or the base station may also be a pico base station, and a pico cell (or a small cell) generated by the pico base station may provide services for the user equipment. However, this disclosure is not limited thereto, and may be applicable to other scenarios.

In an embodiment, the non-3GPP communication may include: Bluetooth communication and/or Wireless Fidelity (WIFI) communication; for example, an unlicensed frequency band is employed. However, this disclosure is not limited thereto, and it may also be other communication modes, for example. The number of links of the non-3GPP communication may be one or more. And furthermore, the remote UE or the relay UE may also communicate with the base station through an air-interface (such as a Uu interface).

In an embodiment, the remote UE may also measure the link of the sidelink communication (hereinafter referred to as a sidelink) and/or the link of the non-3GPP communication (hereinafter referred to as a non-3GPP link) according to the configuration information of the base station, and report results of the measurement of the sidelink and/or the non-3GPP link.

For example, the remote UE may report to the base station one or more communication links of the sidelink, the Bluetooth link and the WIFI link that it currently supports, and an ID of an accessible relay UE may be included, and the selectable link reported by the remote user is within a range supported by the base station. Alternatively, if the base station configures that the remote UE performs measurement and reporting, the remote UE may report results of measurement of the Bluetooth link and/or the WIFI link to the base station, and the results of measurement include the ID of the corresponding relay UE.

Figure 6:
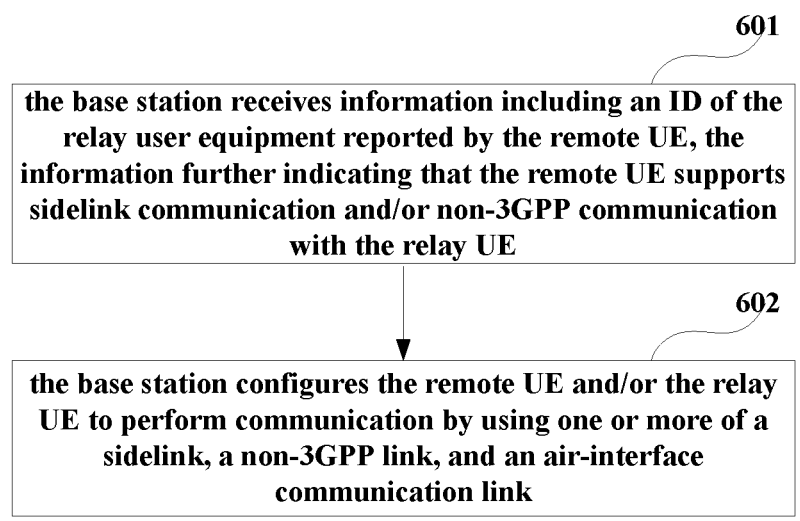
FIG. 6 is another schematic diagram of the information transmission method of Embodiment 1 of this disclosure.

FIG. 6 is another flowchart of the information transmission method of the embodiment of this disclosure, in which a situation at a base station side is shown. As shown in FIG. 6, the information transmission method includes:

Block 601: the base station receives information including an ID of the relay user equipment reported by the remote UE, the information further indicating that the remote UE supports sidelink communication and/or non-3GPP communication with the relay UE; and Block 602: the base station configures the remote UE and/or the relay UE to perform communication by using one or more of a sidelink, a non-3GPP link, and an air-interface communication link (hereinafter referred to as an air-interface link).

Hence, the remote UE may be supported to perform sidelink communication and/or non-3GPP communication with the relay UE.

Figure 7:
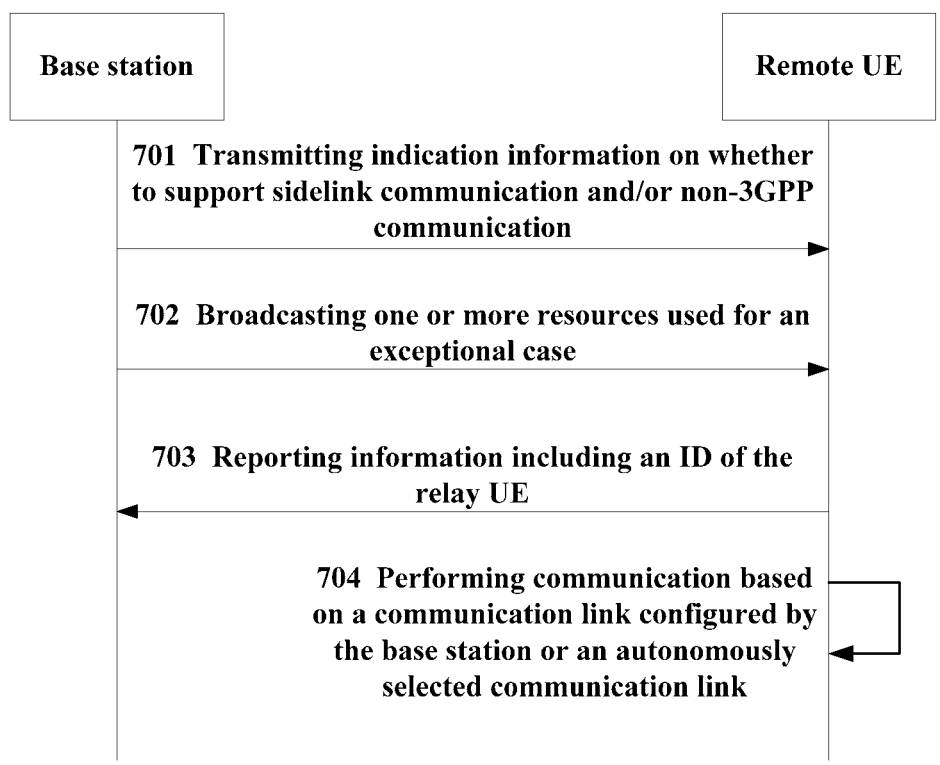
FIG. 7 is a further schematic diagram of the information transmission method of Embodiment 1 of this disclosure.

FIG. 7 is another schematic diagram of the information transmission method of the embodiment of this disclosure, in which a case of a remote UE and a base station is shown. As shown in FIG. 7, the information transmission method includes:

701: the base station transmits indication information on whether to support using the sidelink communication and/or the non-3GPP communication between the remote UE and the relay UE.

For example, the base station may indicate via radio resource control (RRC) signaling whether to support using one or more of the sidelink communication, Bluetooth communication and WIFI to the communication between the remote UE and the relay UE.

702: the base station broadcasts one or more resources used for an exceptional case, the exceptional case being configured to use the sidelink communication and/or the non-3GPP communication.

For example, the base station may configure one or more of the sidelink communication, Bluetooth communication, and WIFI communication for the exceptional case. If the sidelink (or Bluetooth or WIFI) is available for the exceptional case, the base station may simultaneously broadcast an associated resource pool. And when an exceptional case occurs, the UE may autonomously select a communication technique from the supported resources for continuing to transmit data even if the UE is configured to transmit data by using scheduling resources.

Reference may be made to 36.331 V13.1.0 of a long-term evolution (LTE) system for particular contents of an exceptional case, such as a scenario in which a radio link failure (RLF) occurs in a base station, or a scenario in which handover occurs.

703: the remote UE reports information including an ID of the relay UE to the base station, the information further indicating that the remote UE supports the side link communication and/or the non-3GPP communication with the relay UE; and 704: the remote UE performs communication based on a communication link configured by the base station or an autonomously selected communication link.

For example, the remote UE may communicate with the base station based on an air-interface link configured by the base station, or communicate with the relay UE based on the WIFI link configured by the base station, or communicate with the relay UE based on an autonomously selected Bluetooth link.

It should be noted that FIG. 7 only illustrates the embodiment of this disclosure. For example, contents of how the relay UE interacts with the base station are omitted in FIG. 7. However, this disclosure is not limited thereto, and an order of execution of the steps or blocks may be appropriately adjusted, and other steps or blocks may be added or some of the steps or blocks may be reduced. And appropriate modifications may be made by those skilled in the art based on the above contents, without being only limited to what is contained in the above figure.

It can be seen from the above embodiments that the remote UE reports information including the ID of the relay UE to the base station, the information further indicating that the remote UE supports the sidelink communication and/or the non-3GPP communication with the relay UE; and the remote UE performs communication based on the communication link configured by the base station or the autonomously selected communication link.

Hence, not only the UE may be made power-saving, for example, the remote UE may perform data transmission with an adjacent relay UE without needing to enlarge power to communicate with a base station; but also continuity of data transmission may be kept, for example, when an air-interface issue occurs, the remote UE may select the non-3GPP technique to perform communication with the relay UE, thereby avoiding a problem of interruption during the transmission.

Embodiment 2

These embodiments of this disclosure describe a case where a communication link between a remote UE and a relay UE is changed on the basis of Embodiment 1. A link using air-interface communication being changed into a link using non-3GPP communication is described in these embodiments.

Figure 8:
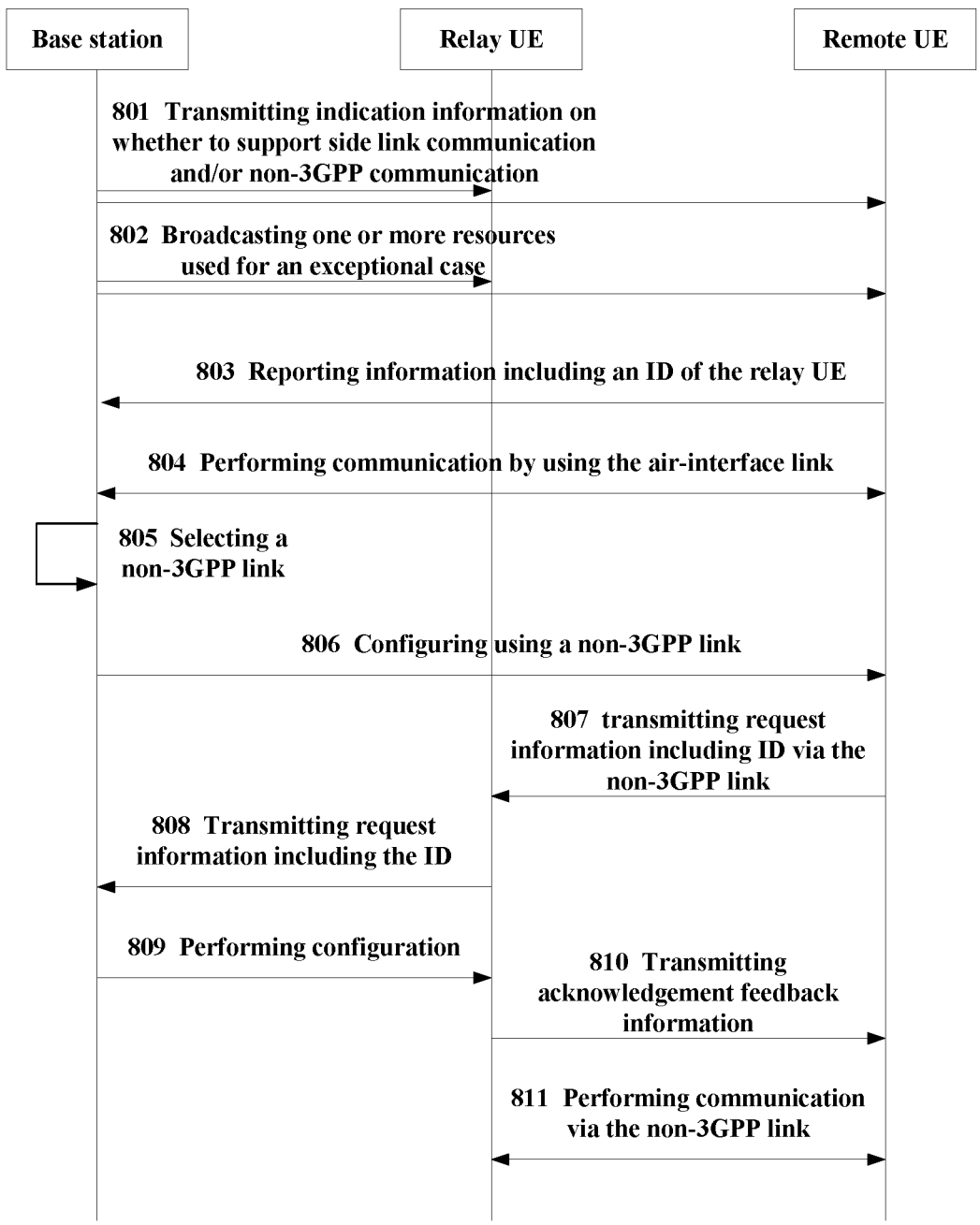
FIG. 8 is a schematic diagram of the information transmission method of Embodiment 2 of this disclosure.

FIG. 8 is a flowchart of an information transmission method of the embodiment of this disclosure, in which a case of a remote UE, a relay UE and a base station is shown. As shown in FIG. 8, the information transmission method includes:

801: the base station transmits indication information on whether to support using side link communication and/or non-3GPP communication between the remote UE and the relay UE;

802: the base station broadcasts one or more resources used for an exceptional case, the exceptional case being configured to use the sidelink communication and/or the non-3GPP communication;

803: the remote UE reports information including an ID of the relay UE to the base station, the information further indicating that the remote UE supports sidelink communication and/or non-3GPP communication with the relay UE.

In addition, the remote UE may also measure the sidelink and/or the non-3GPP link according to the configuration information of the base station, and report results of the measurement of the sidelink and/or the non-3GPP link.

804: the remote UE performs communication by using the air-interface link.

In an embodiment, the remote UE may communicate with the base station by using the air-interface link. Reference may be made to related techniques for how to use the air-interface link, which is omitted in FIG. 8 for the sake of simplicity.

805: the base station selects a non-3GPP link for the remote UE for performing communication.

In an embodiment, the base station may configure that the remote UE uses the Bluetooth link or the WIFI link to communicate with the relay UE when a payload is relatively heavy, thereby alleviating an air-interface payload.

806: the base station configures that the remote UE uses a non-3GPP link.

The remote UE may acknowledge using the non-3GPP link according to configuration information transmitted by the base station.

807: the remote UE transmits request information including the ID of the remote UE to the relay UE via the non-3GPP link.

For example, the remote UE transmits the request information to the relay UE via a communication link (such as a WIFI link) configured by the base station, the request information including an ID of the remote UE itself, such as a radio network temporary identifier (RNTI), a ProSe UE ID, or an IP address.

808: the relay UE transmits request information including the ID of the remote UE and information on the non-3GPP link to the base station when the relay UE receives the request information.

For example, the relay UE transmits the request information including the ID of the remote UE to the base station, and informs the base station of a link (such as a WIFI link) that the remote UE expects to use.

809: the base station configures the relay UE;

810: the relay UE transmits acknowledgement feedback information to the remote UE when the relay UE receives the configuration information of the base station; and

811: the remote UE communicates with the relay UE by using the non-3GPP link.

For example, the remote UE transmits data to the base station via the relay UE.

It should be noted that FIG. 8 only illustrates the embodiment of this disclosure. However, this disclosure is not limited thereto, and an order of execution of the steps or blocks may be appropriately adjusted, and other steps or blocks may be added or some of the steps or blocks may be reduced. And appropriate modifications may be made by those skilled in the art based on the above contents, without being only limited to what is contained in the above figure.

It can be seen from the above embodiment that the remote UE reports information including the ID of the relay UE to the base station, the information further indicating that the remote UE supports the sidelink communication and/or the non-3GPP communication with the relay UE; and the remote UE performs communication based on the communication link configured by the base station or the autonomously selected communication link.

Hence, not only the UE may be made power-saving, for example, the remote UE may perform data transmission with an adjacent relay UE without needing to enlarge power to communicate with a base station; but also continuity of data transmission may be kept, for example, when an air-interface issue occurs, the remote UE may select the non-3GPP technique to perform communication with the relay UE, thereby avoiding a problem of interruption during the transmission.

Embodiment 3

These embodiments of this disclosure describe a case where a communication link between a remote UE and a relay UE is changed on the basis of Embodiment 1. Use of a non-3GPP link being changed into use of a sidelink or an air-interface link is described in these embodiments.

Figure 9:
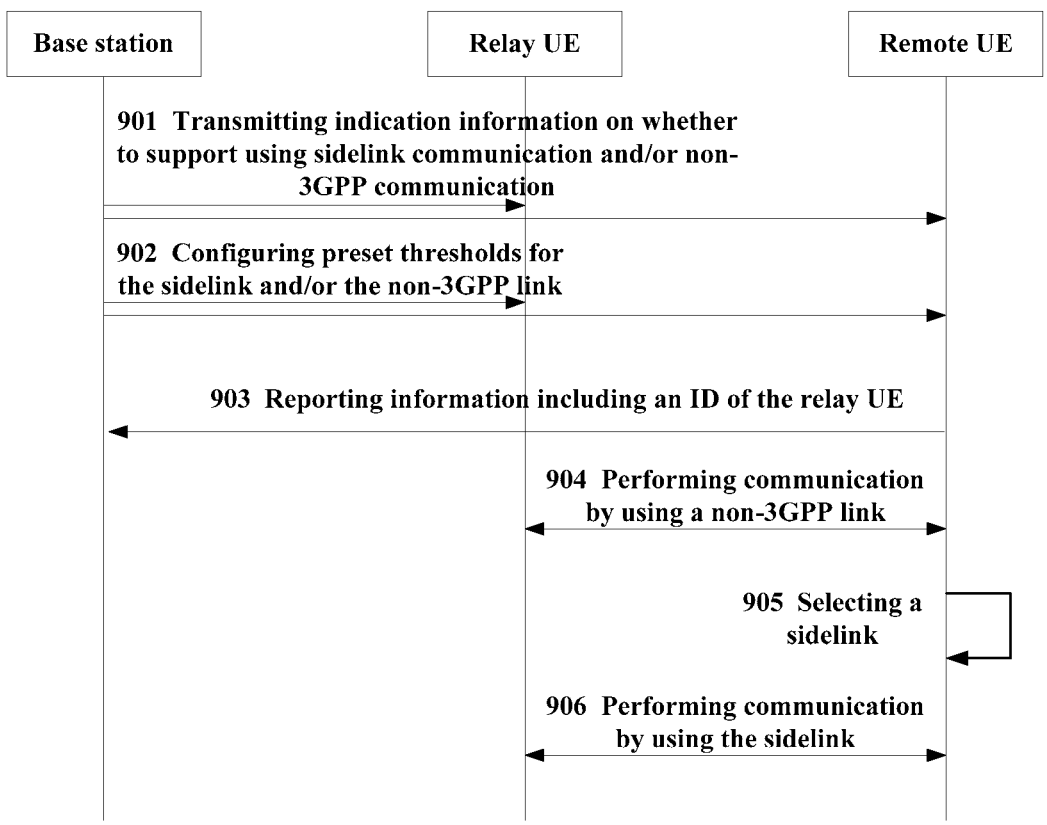
FIG. 9 is a schematic diagram of the information transmission method of Embodiment 3 of this disclosure.

FIG. 9 is a flowchart of an information transmission method of the embodiment of this disclosure, in which a case of a remote UE, a relay UE and a base station is shown; the remote UE is in an idle state. As shown in FIG. 9, the information transmission method includes:

901: the base station transmits indication information on whether to support using sidelink communication and/or non-3GPP communication between the remote UE and the relay UE;

902: the base station configures preset thresholds for the sidelink and/or the non-3GPP link.

For example, the base station may configure two thresholds (denoted as t1 and t3) for channel quality of each non-3GPP communication link, and the base station may also configure a threshold (denoted as t2) for channel quality of the link of the sidelink communication. The above thresholds are determined by simulation or determined according to empirical values, and particular values of the thresholds are not limited in this disclosure.

903: the remote UE reports information including an ID of the relay UE to the base station, the information further indicating that the remote UE supports sidelink communication and/or non-3GPP communication with the relay UE.

In addition, the remote UE may also measure the sidelink and/or the non-3GPP link according to the configuration information of the base station; and report results of the measurement of the sidelink and/or the non-3GPP link.

904: the remote UE communicates with the relay UE by using a non-3GPP link;

905: the remote UE selects a sidelink.

In an implementation, in a case where the remote UE communicates with the relay UE by using the non-3GPP link, if channel quality of the non-3GPP link is lower than a first preset threshold (such as t1) and channel quality of the sidelink is higher than a second predetermined threshold (such as t2), the remote UE may autonomously select the sidelink.

906: the remote UE continues to communicate with the relay UE by using the sidelink.

Hence, the link using the non-3GPP communication may be changed into the link using the sidelink communication. It should be noted that some steps or blocks are omitted for the sake of simplicity. For example, the contents of how the relay UE interacts with the base station are omitted in FIG. 9, and reference may be made to related techniques for the omitted contents.

Figure 10:
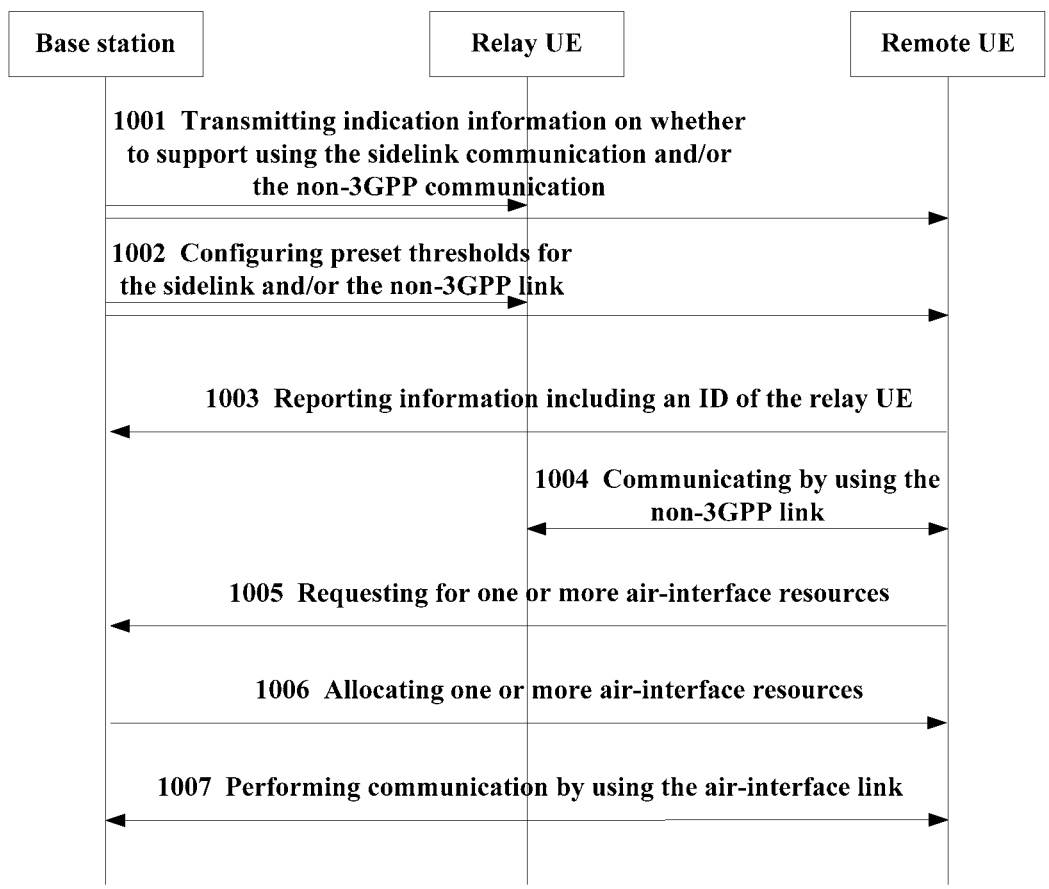
FIG. 10 is another schematic diagram of the information transmission method of Embodiment 3 of this disclosure.

FIG. 10 is another schematic diagram of the information transmission method of the embodiment of this disclosure, in which a case of a remote UE, a relay UE and a base station is shown; the remote UE is first in an idle state. As shown in FIG. 10, the information transmission method includes:

1001: the base station transmits indication information on whether to support using the sidelink communication and/or the non-3GPP communication between the remote UE and the relay UE;

1002: the base station configures preset thresholds for the sidelink and/or the non-3GPP link.

For example, the base station may configure two thresholds (denoted as t1 and t3) for channel quality of each non-3GPP communication link, and the base station may also configure a threshold (denoted as t2) for channel quality of the link of the sidelink communication. The above thresholds are determined by simulation or determined according to empirical values, particular values of the thresholds are not limited in this disclosure.

1003: the remote UE reports information including an ID of the relay UE to the base station, the information further indicating that the remote UE supports sidelink communication and/or non-3GPP communication with the relay UE.

In addition, the remote UE may also measure the non-3GPP communication link according to the configuration information of the base station, and report a result of the measurement of the non-3GPP communication link.

1004: the remote UE communicates with the relay UE by using the non-3GPP link;

1005: the remote UE requests the base station for one or more resources for air-interface communication.

In an implementation, in a case where the remote UE communicates with the relay UE by using the non-3GPP link, if channel quality of the non-3GPP link is lower than a first preset threshold (such as t1) and channel quality of the sidelink is lower than or equal to a second preset threshold (such as t2), the remote UE may enter into a connected state and apply the base station for the air-interface resources.

1006: the base station allocates an air-interface resources for the remote UE; and

1007: the remote UE performs communication by using the air-interface link.

Hence, the link using the non-3GPP communication may be changed into using the air-interface link. It should be noted that some steps or blocks are omitted for the sake of simplicity. For example, the contents of how the relay UE interacts with the base station are omitted in FIG. 10, and reference may be made to related techniques for the omitted contents.

Figure 11:
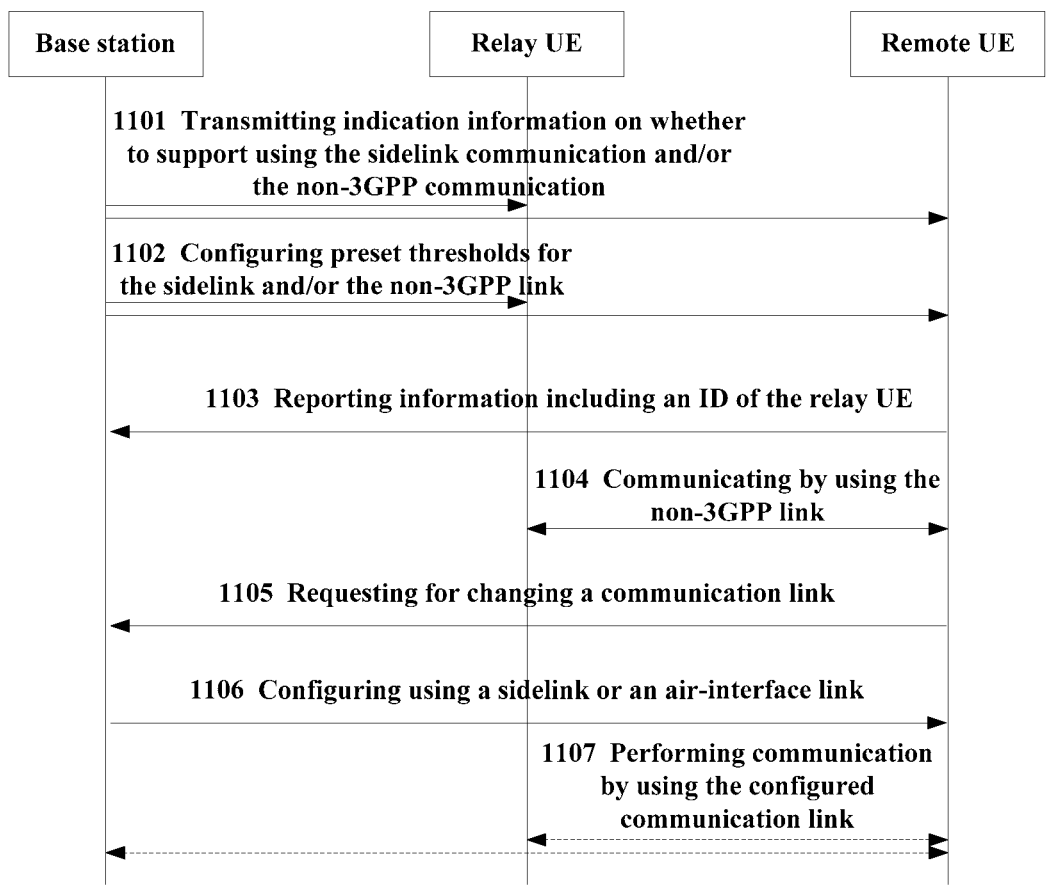
FIG. 11 is a further schematic diagram of the information transmission method of Embodiment 3 of this disclosure.

FIG. 11 is a further schematic diagram of the information transmission method of the embodiment of this disclosure, in which a case of a remote UE, a relay UE and a base station is shown; the remote UE is in a connected state. As shown in FIG. 11, the information transmission method includes:

1101: the base station transmits indication information on whether to support using the sidelink communication and/or the non-3GPP communication between the remote UE and the relay UE;

1102: the base station configures preset thresholds for the sidelink and/or the non-3GPP link.

For example, the base station may configure two thresholds (denoted as t1 and t3) for channel quality of each non-3GPP communication link, and the base station may also configure a threshold (denoted as t2) for channel quality of the sidelink. The above thresholds are determined by simulation or determined according to empirical values, particular values of the thresholds are not limited in this disclosure.

1103: the remote UE reports information including an ID of the relay UE to the base station, the information further indicating that the remote UE supports sidelink communication and/or non-3GPP communication with the relay UE.

In addition, the remote UE may also measure the sidelink and/or the non-3GPP communication link according to the configuration information of the base station, and report results of the measurement of the sidelink and/or the non-3GPP link.

1104: the remote UE communicates with the relay UE by using the non-3GPP link;

1105: the remote UE requests the base station for changing a communication link.

In an implementation, in a case where the remote UE communicates with the relay UE by using the non-3GPP link, if channel quality of the non-3GPP link is lower than a third preset threshold (such as t3) and the remote UE is in a connected state, the remote UE may request the base station for changing a communication link.

The request may include information on one or more resources in which the remote UE is interested (such as information on sidelinks in which the remote UE is interested), and may further include related results of channel measurement.

1106: the base station configures that the remote UE uses a sidelink or an air-interface link; and

1107: the remote UE performs communication by using the communication link configured by the base station.

For example, the remote UE may communicate with the base station based on the air-interface link configured by the base station, or communicate with the relay UE based on the sidelink configured by the base station.

Hence, using the non-3GPP link may be changed into using the link configured by the base station. Some steps or blocks are omitted for the sake of simplicity. For example, the contents of how the relay UE interacts with the base station are omitted in FIG. 11, and reference may be made to related techniques for the omitted contents.

It should be noted that FIGS. 9-11 only illustrate the embodiment of this disclosure. However, this disclosure is not limited thereto, and an order of execution of the steps or blocks may be appropriately adjusted, and other steps or blocks may be added or some of the steps or blocks may be reduced. And appropriate modifications may be made by those skilled in the art based on the above contents, without being only limited to what is contained in the above figures.

It can be seen from the above embodiment that the remote UE reports information including the ID of the relay UE to the base station, the information further indicating that the remote UE supports the sidelink communication and/or the non-3GPP communication with the relay UE; and the remote UE performs communication based on the communication link configured by the base station or the autonomously selected communication link.

Hence, not only the UE may be made power-saving, for example, the remote UE may perform data transmission with an adjacent relay UE without needing to enlarge power to communicate with a base station; but also continuity of data transmission may be kept, for example, when an air-interface issue occurs, the remote UE may select the non-3GPP technique to perform communication with the relay UE, thereby avoiding a problem of interruption during the transmission.

Embodiment 4

These embodiments of this disclosure describe a case where a communication link between a remote UE and a relay UE is changed on the basis of Embodiment 1. Use of a sidelink being changed into use of a non-3GPP link or an air-interface link is described in these embodiments.

Figure 12:
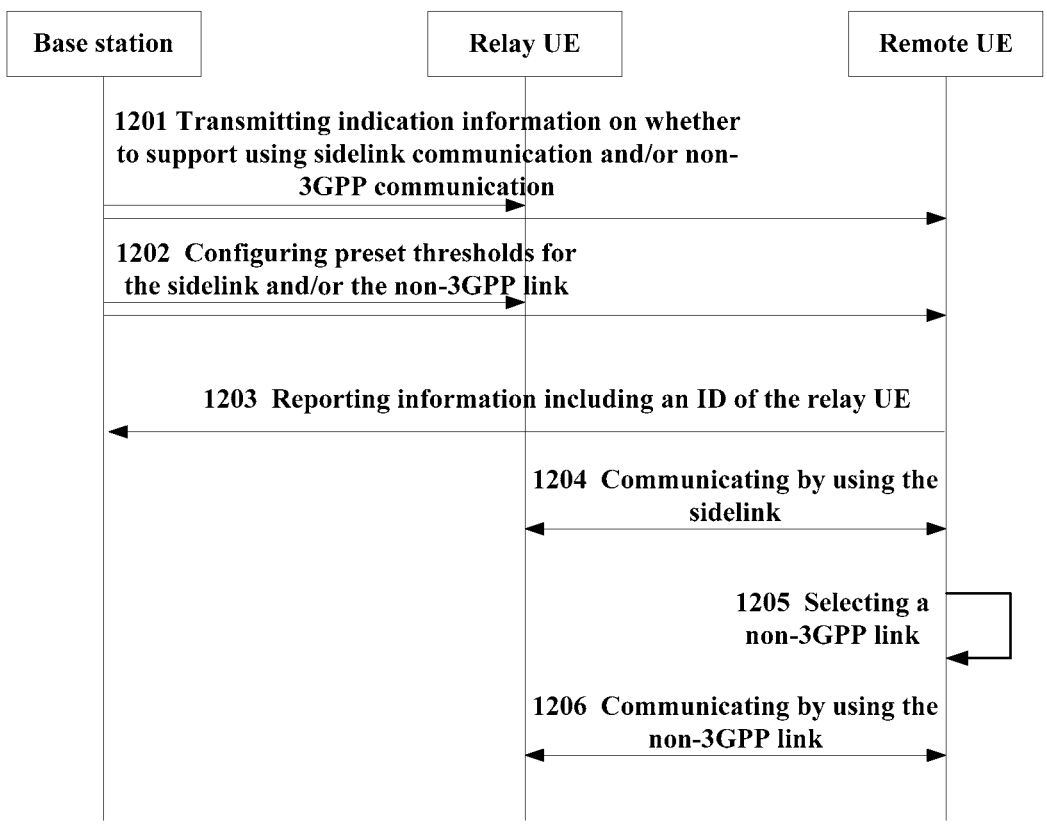
FIG. 12 is a schematic diagram of the information transmission method of Embodiment 4 of this disclosure.

FIG. 12 is a flowchart of an information transmission method of the embodiment of this disclosure, in which a case of a remote UE, a relay UE and a base station is shown; the remote UE is in an idle state. As shown in FIG. 12, the information transmission method includes:

1201: the base station transmits indication information on whether to support using sidelink communication and/or non-3GPP communication between the remote UE and the relay UE;

1202: the base station configures preset thresholds for the sidelink and/or the non-3GPP link.

For example, the base station may configure two thresholds (denoted as t4 and t6) for channel quality of each non-3GPP communication link, and the base station may also configure a threshold (denoted as t5) for channel quality of the sidelink. The above thresholds are determined by simulation or determined according to empirical values, and particular values of the thresholds are not limited in this disclosure.

1203: the remote UE reports information including an ID of the relay UE to the base station, the information further indicating that the remote UE supports sidelink communication and/or non-3GPP communication with the relay UE.

In addition, the remote UE may also measure the sidelink and/or the non-3GPP link according to the configuration information of the base station; and report results of the measurement of the sidelink and/or the non-3GPP link.

1204: the remote UE communicates with the relay UE by using the sidelink;

1205: the remote UE selects a non-3GPP link.

In an embodiment, in a case where the remote UE communicates with the relay UE by using the sidelink, if channel quality of the sidelink is lower than a fifth preset threshold (such as t5) and channel quality of the non-3GPP link is higher than a fourth predetermined threshold (such as t4), the remote UE may autonomously select the non-3GPP link.

1206: the remote UE communicates with the relay UE by using the non-3GPP link.

Hence, using the sidelink may be changed into using the non-3GPP link. It should be noted that some steps or blocks are omitted for the sake of simplicity. For example, the contents of how the relay UE interacts with the base station are omitted in FIG. 12, and reference may be made to related techniques for the omitted contents.

Figure 13:
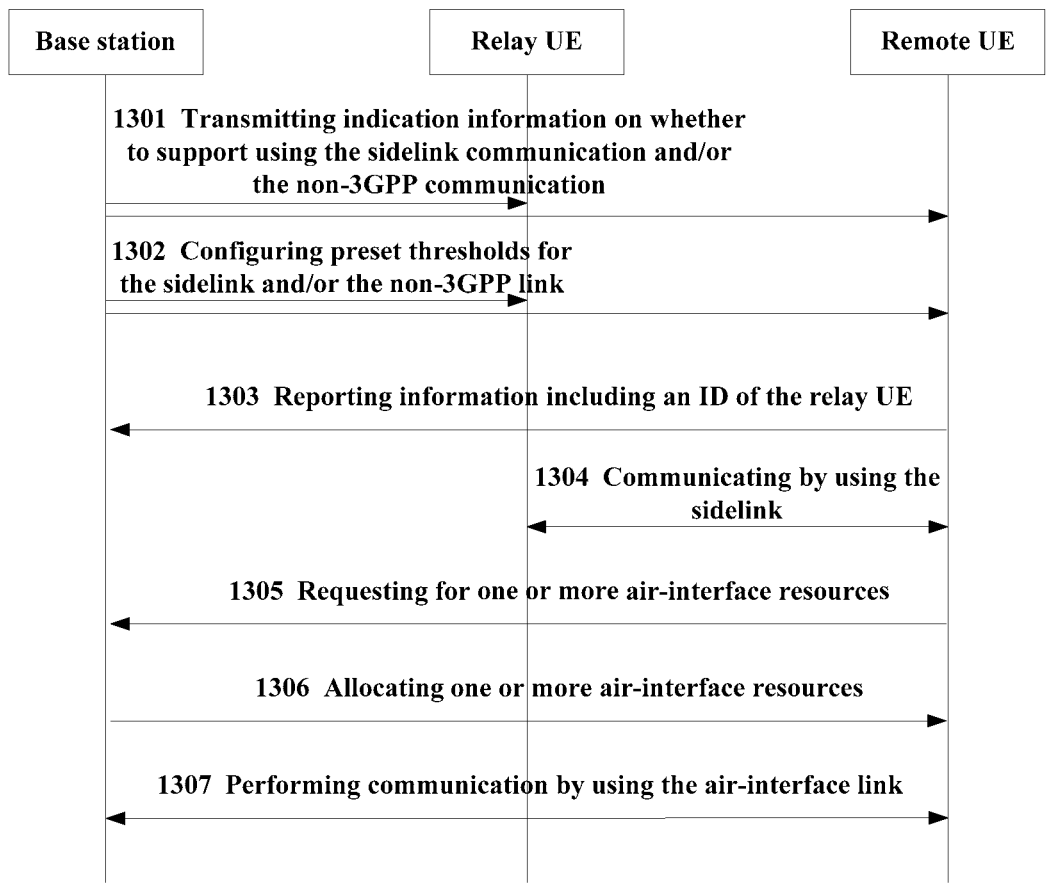
FIG. 13 is another schematic diagram of the information transmission method of Embodiment 4 of this disclosure.

FIG. 13 is another schematic diagram of the information transmission method of the embodiment of this disclosure, in which a case of a remote UE, a relay UE and a base station is shown; the remote UE is first in an idle state. As shown in FIG. 13, the information transmission method includes:

1301: the base station transmits indication information on whether to support using the sidelink communication and/or the non-3GPP communication between the remote UE and the relay UE;

1302: the base station configures preset thresholds for the sidelink and/or the non-3GPP link.

For example, the base station may configure two thresholds (denoted as t4 and t6) for channel quality of each non-3GPP communication link, and the base station may also configure a threshold (denoted as t5) for channel quality of the sidelink. The above thresholds are determined by simulation or determined according to empirical values, and particular values of the thresholds are not limited in this disclosure.

1303: the remote UE reports information including an ID of the relay UE to the base station, the information further indicating that the remote UE supports sidelink communication and/or non-3GPP communication with the relay UE.

In addition, the remote UE may also measure the sidelink and/or the non-3GPP link according to the configuration information of the base station, and report results of the measurement of the sidelink and/or the non-3GPP link.

1304: the remote UE communicates with the relay UE by using the sidelink;

1305: the remote UE requests the base station for an air-interface resource.

In an embodiment, in a case where the remote UE communicates with the relay UE by using the sidelink, if channel quality of the sidelink is lower than a fifth preset threshold (such as t5) and channel quality of the non-3GPP link is lower than or equal to a fourth preset threshold (such as t4), the remote UE may enter into a connected state and apply the base station for the air-interface resources.

1306: the base station allocates an air-interface resource for the remote UE; and

1307: the remote UE performs communication by using the air-interface link.

Hence, using the sidelink may be changed into using the air-interface link. It should be noted that some steps or blocks are omitted for the sake of simplicity. For example, the contents of how the relay UE interacts with the base station are omitted in FIG. 13, and reference may be made to related techniques for the omitted contents.

Figure 14:
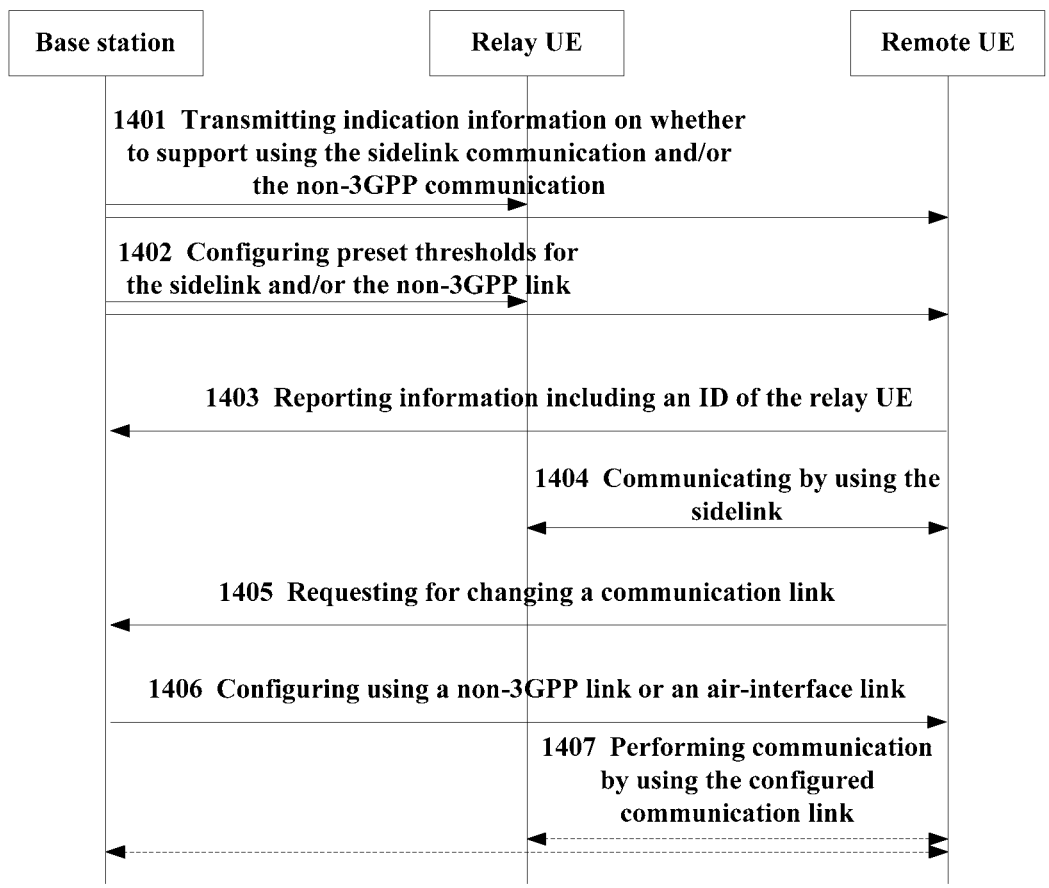
FIG. 14 is a further schematic diagram of the information transmission method of Embodiment 4 of this disclosure.

FIG. 14 is a further schematic diagram of the information transmission method of the embodiment of this disclosure, in which a case of a remote UE, a relay UE and a base station is shown; the remote UE is in a connected state. As shown in FIG. 14, the information transmission method includes:

1401: the base station transmits indication information on whether to support using the sidelink communication and/or the non-3GPP communication between the remote UE and the relay UE;

1402: the base station configures preset thresholds for the sidelink and/or the non-3GPP link.

For example, the base station may configure two thresholds (denoted as t4 and t6) for channel quality of each non-3GPP link, and the base station may also configure a threshold (denoted as t5) for channel quality of the sidelink. The above thresholds are determined by simulation or determined according to empirical values, particular values of the thresholds are not limited in this disclosure.

1403: the remote UE reports information including an ID of the relay UE to the base station, the information further indicating that the remote UE supports sidelink communication and/or non-3GPP communication with the relay UE.

In addition, the remote UE may also measure the sidelink and/or the non-3GPP communication link according to the configuration information of the base station, and report results of the measurement of the sidelink and/or the non-3GPP link.

1404: the remote UE communicates with the relay UE by using the sidelink;

1405: the remote UE requests the base station for changing a communication link.

In an embodiment, in a case where the remote UE communicates with the relay UE by using the sidelink, if channel quality of the sidelink is lower than a sixth preset threshold (such as t6) and the remote UE is in a connected state, the remote UE may request the base station for changing a communication link.

The request may include information on resources in which the remote UE is interested (such as information on non-3GPP links in which the remote UE is interested), and may further include related results of channel measurement.

1406: the base station configures a non-3GPP link or an air-interface link for the remote UE; and

1407: the remote UE performs communication by using the communication link configured by the base station.

For example, the remote UE may communicate with the base station based on the air-interface link configured by the base station, or communicate with the relay UE based on a WIFI link configured by the base station, or communicate with the relay UE based on a Bluetooth link configured by the base station.

Hence, using the sidelink may be changed into using the link configured by the base station. Some steps or blocks are omitted for the sake of simplicity. For example, the contents of how the relay UE interacts with the base station are omitted in FIG. 14, and reference may be made to related techniques for the omitted contents.

It should be noted that FIGS. 12-14 only illustrate the embodiment of this disclosure. However, this disclosure is not limited thereto, and an order of execution of the steps or blocks may be appropriately adjusted, and other steps or blocks may be added or some of the steps or blocks may be reduced. And appropriate modifications may be made by those skilled in the art based on the above contents, without being only limited to what is contained in the above figures.

It can be seen from the above embodiment that the remote UE reports information including the ID of the relay UE to the base station, the information further indicating that the remote UE supports the sidelink communication and/or the non-3GPP communication with the relay UE; and the remote UE performs communication based on the communication link configured by the base station or the autonomously selected communication link.

Hence, not only the UE may be made power-saving, for example, the remote UE may perform data transmission with an adjacent relay UE without needing to enlarge power to communicate with a base station; but also continuity of data transmission may be kept, for example, when an air-interface issue occurs, the remote UE may select the non-3GPP technique to perform communication with the relay UE, thereby avoiding a problem of interruption during the transmission.

Embodiment 5

These embodiments of this disclosure provide an information transmission apparatus, which may be configured in a remote UE, with contents identical to those in embodiments 1-4 being not going to be described herein any further.

Figure 15:
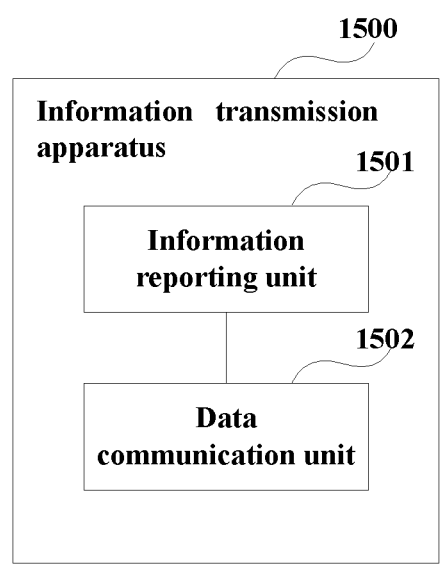
FIG. 15 is a schematic diagram of the information transmission apparatus of Embodiment 5 of this disclosure.

FIG. 15 is a schematic diagram of the information transmission apparatus of the embodiment of this disclosure. As shown in FIG. 15, an information transmission apparatus 1500 includes:

an information reporting unit 1501 configured to report information including an ID of a relay UE to a base station, the information further indicating that the remote UE supports sidelink communication and/or non-3GPP communication with the relay UE; and a data communication unit 1502 configured to perform communication based on a communication link configured by the base station or a communication link selected by the remote UE.

In an embodiment, the non-3GPP communication may include Bluetooth communication and/or wireless fidelity (WIFI) communication; however, this disclosure is not limited thereto. And the number of non-3GPP links may be one or more.

Figure 16:
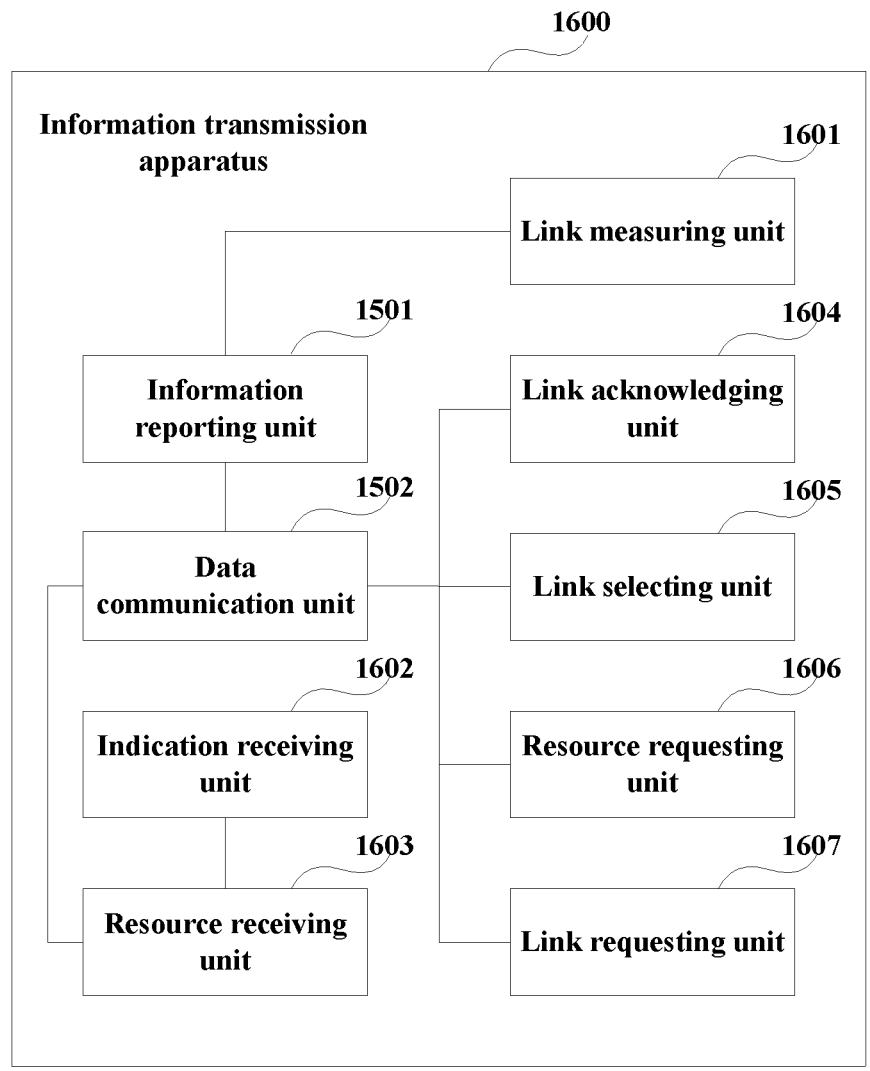
FIG. 16 is another schematic diagram of the information transmission apparatus of Embodiment 5 of this disclosure.

FIG. 16 is another schematic diagram of the information transmission apparatus of the embodiment of this disclosure. As shown in FIG. 16, an information transmission apparatus 1600 includes the information reporting unit 1501 and the data communication unit 1502, as described above.

As shown in FIG. 16, the information transmission apparatus 1600 may further include:

a link measuring unit 1601 configured to measure a sidelink and/or a non-3GPP link;

and the information reporting unit 1501 may further be configured to report a measurement result(s) of the sidelink and/or the non-3GPP link.

As shown in FIG. 16, the information transmission apparatus 1600 may further include:

an indication receiving unit 1602 configured to receive indication information transmitted by the base station on whether it is supported that the sidelink communication and/or the non-3GPP communication is/are used between the remote UE and the relay UE.

As shown in FIG. 16, the information transmission apparatus 1600 may further include:

a resource receiving unit 1603 configured to receive one or more resources used for an exceptional case broadcasted by the base station, the exceptional case being configured to use the sidelink communication and/or the non-3GPP communication.

In an embodiment, as shown in FIG. 16, the information transmission apparatus 1600 may further include:

a link acknowledging unit 1604 configured to acknowledge using a non-3GPP link according to configuration information transmitted by the base station when the remote UE uses an air-interface link;

and the data communication unit 1502 may further be configured to communicate with the relay UE by using the non-3GPP link.

The remote UE may transmit request information including an ID of the remote UE to the relay UE via the non-3GPP link; and the relay UE transmits a request including the ID of the remote UE and information on the non-3GPP link to the base station when the relay UE receives the request information, and transmit acknowledgement feedback information to the remote UE when the relay UE receives the configuration information of the base station.

In another embodiment, as shown in FIG. 16, the information transmission apparatus 1600 may further include:

a link selecting unit 1605 configured to select a sidelink, when the remote UE is using a non-3GPP link to communicate with the relay UE and channel quality of the non-3GPP link is lower than a first predetermined threshold and channel quality of the sidelink is higher than a second predetermined threshold;

and the data communication unit 1502 may further be configured to communicate with the relay UE by using the sidelink.

In a further embodiment, as shown in FIG. 16, the information transmission apparatus 1600 may further include:

a resource requesting unit 1606 configured to make the remote UE enter into a connected state and request the base station for one or more air-interface resources, when the remote UE is using a non-3GPP link to communicate with the relay UE and channel quality of the non-3GPP link is lower than a first predetermined threshold and channel quality of a sidelink is lower than or equal to a second predetermined threshold;

and the data communication unit 1502 may further be configured to communicate by using an air-interface link according to the air-interface resources transmitted by the base station.

In still another embodiment, as shown in FIG. 16, the information transmission apparatus 1600 may further include:

a link requesting unit 1607 configured to request the base station to change a communication link, when the remote UE is using a non-3GPP link to communicate with the relay UE and channel quality of the non-3GPP link is lower than a third predetermined threshold and the remote UE is in a connected state;

and the data communication unit 1502 may further be configured to communicate by using a sidelink or an air-interface link configured by the base station according to the configuration information transmitted by the base station.

In yet another embodiment, the link selecting unit 1605 may further be configured to select a non-3GPP link, when the remote UE is using a sidelink to communicate with the relay UE and channel quality of the sidelink is lower than a fourth predetermined threshold and the channel quality of the non-3GPP link is higher than a fifth predetermined threshold;

and the data communication unit 1502 may further be configured to communicate with the relay UE by using the non-3GPP link.

In further still another embodiment, the resource requesting unit 1606 may further be configured to make the remote UE enter into a connected state and request the base station for one or more air-interface resources, when the remote UE is using a sidelink to communicate with the relay UE and channel quality of the sidelink is lower than a fourth predetermined threshold and the channel quality of a non-3GPP link is lower than or equal to a fifth predetermined threshold;

and the data communication unit 1502 may further be configured to communicate by using an air-interface link according to the air-interface resources transmitted by the base station.

In yet still another embodiment, the link requesting unit 1607 may further be configured to request the base station to change a communication link, when the remote UE is using a sidelink to communicate with the relay UE and channel quality of a sidelink is lower than a sixth predetermined threshold and the remote UE is in a connected state;

and the data communication unit 1502 may further be configured to communicate by using a non-3GPP link or an air-interface link configured by the base station according to the configuration information transmitted by the base station.

It can be seen from the above embodiment that the remote UE reports information including the ID of the relay UE to the base station, the information further indicating that the remote UE supports the sidelink communication and/or the non-3GPP communication with the relay UE; and the remote UE performs communication based on the communication link configured by the base station or the autonomously selected communication link.

Hence, not only the UE may be made power-saving, for example, the remote UE may perform data transmission with an adjacent relay UE without needing to enlarge power to communicate with a base station; but also continuity of data transmission may be kept, for example, when an air-interface issue occurs, the remote UE may select the non-3GPP technique to perform communication with the relay UE, thereby avoiding a problem of interruption during the transmission.

Embodiment 6

These embodiments of this disclosure provide an information transmission apparatus, which may be configured in a base station, with contents identical to those in embodiments 1-4 being not going to be described herein any further.

Figure 17:
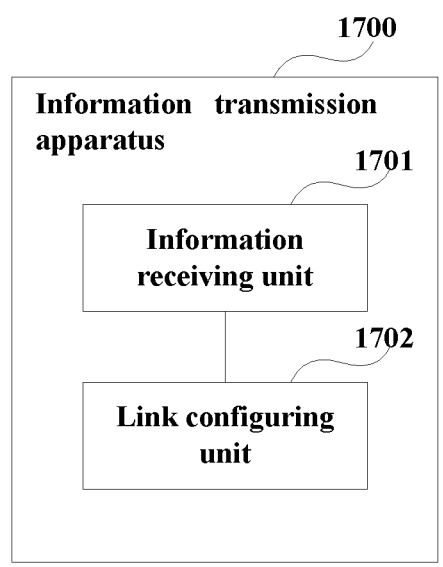
FIG. 17 is a schematic diagram of the information transmission apparatus of Embodiment 6 of this disclosure.

FIG. 17 is a schematic diagram of the information transmission apparatus of the embodiment of this disclosure. As shown in FIG. 17, an information transmission apparatus 1700 includes:

an information receiving unit 1701 configured to receive information including an ID of a relay UE reported by a remote UE, the information further indicating that the remote UE supports sidelink communication and/or non-3GPP communication with the relay UE; and a link configuring unit 1702 configured to configure that the remote UE and/or the relay UE use(s) one or more of a sidelink, a non-3GPP link and an air-interface link to communicate.

Figure 18:
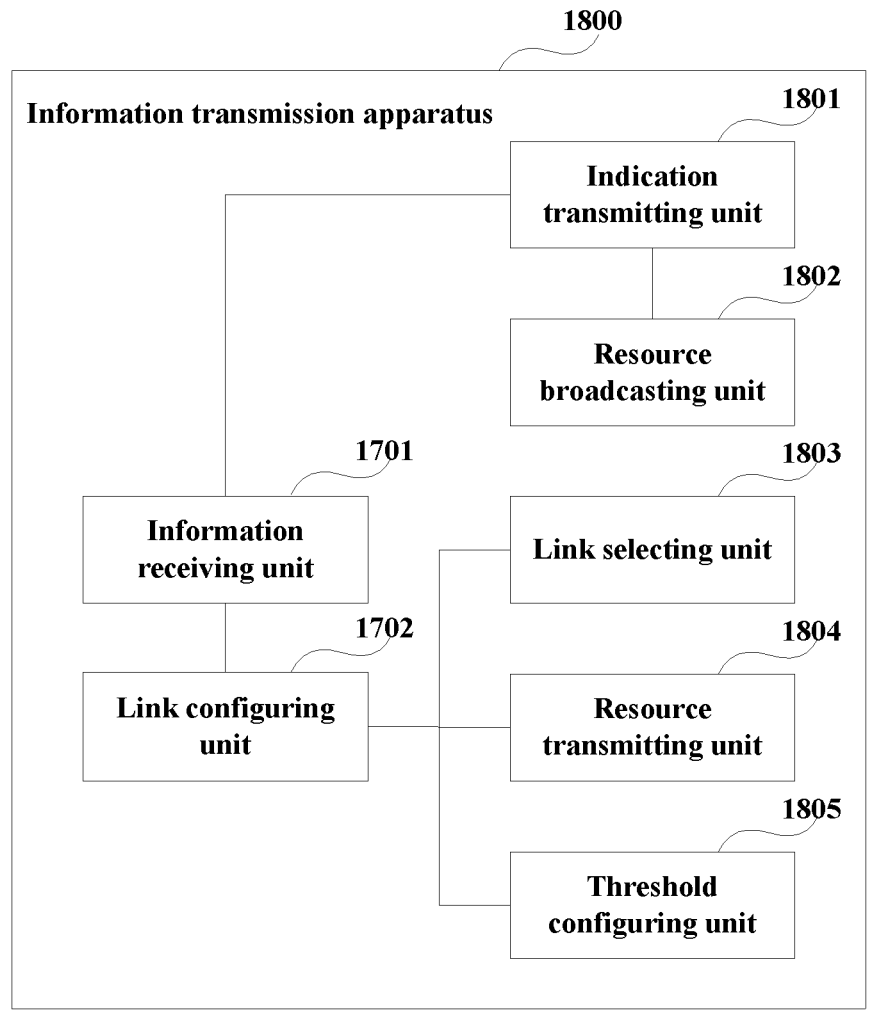
FIG. 18 is another schematic diagram of the information transmission apparatus of Embodiment 6 of this disclosure.

FIG. 18 is another schematic diagram of the information transmission apparatus of the embodiment of this disclosure. As shown in FIG. 18, an information transmission apparatus 1800 includes the information receiving unit 1701 and the link configuring unit 1702, as described above.

As shown in FIG. 18, the information transmission apparatus 1800 may further include:

an indication transmitting unit 1801 configured to transmit indication information on whether it is supported that the sidelink communication and/or the non-3GPP communication is/are used between the remote UE and the relay UE.

As shown in FIG. 18, the information transmission apparatus 1800 may further include:

a resource broadcasting unit 1802 configured to broadcast one or more resources used for an exceptional case, the exceptional case being configured to use the sidelink communication and/or the non-3GPP communication.

As shown in FIG. 18, the information transmission apparatus 1800 may further include:

a link selecting unit 1803 configured to select a non-3GPP link for the remote UE to communicate with the relay UE when the remote UE is using an air-interface link to communicate;

or select a sidelink or the air-interface link for the remote UE to communicate when receiving a request for changing a communication link transmitted by the remote UE in a connected state using the non-3GPP link to communicate;

or select the non-3GPP link or the air-interface link for the remote UE to communicate when receiving a request for changing a communication link transmitted by the remote UE in a connected state using the sidelink to communicate.

As shown in FIG. 18, the information transmission apparatus 1800 may further include:

a resource transmitting unit 1804 configured to transmit one or more air-interface resources to the remote UE when receiving a request for resource transmitted by the remote UE in an idle state.

As shown in FIG. 18, the information transmission apparatus 1800 may further include:

a threshold configuring unit 1805 configured to configure each non-3GPP link with one or more predetermined thresholds, and configure each sidelink with at least one predetermined threshold.

It can be seen from the above embodiment that the remote UE reports information including the ID of the relay UE to the base station, the information further indicating that the remote UE supports the sidelink communication and/or the non-3GPP communication with the relay UE; and the remote UE performs communication based on the communication link configured by the base station or the autonomously selected communication link.

Hence, not only the UE may be made power-saving, for example, the remote UE may perform data transmission with an adjacent relay UE without needing to enlarge power to communicate with a base station; but also continuity of data transmission may be kept, for example, when an air-interface issue occurs, the remote UE may select the non-3GPP technique to perform communication with the relay UE, thereby avoiding a problem of interruption during the transmission.

Embodiment 7

These embodiments of this disclosure provide an information transmission method, in which an initial access procedure initiated by new services is described. These embodiments may be applicable to the scenario shown in FIG. 4, a relay UE is within coverage of a cell, and a remote UE is within extended coverage.

The so-called extended coverage is, for example, a range where a machine type communication (MTC) UE at an edge of a cell or a narrow band Internet of Things (NB-IoT) UE is located. For example, the UE can only transmit/receive a message after multiple times of attempts (or at enlarged power).

Figure 19:
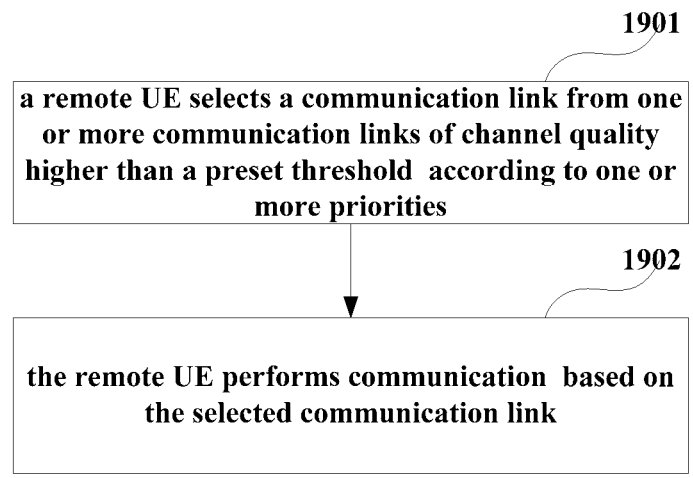
FIG. 19 is a schematic diagram of the information transmission method of Embodiment 7 of this disclosure.

FIG. 19 is a flowchart of the information transmission method of the embodiment of this disclosure, in which a case at a remote UE side is shown. As shown in FIG. 19, the information transmission method includes:

Block 1901: the remote UE selects a communication link for communicating with a relay UE from one or more communication links of channel quality higher than a preset threshold according to a priority; the communication link includes a sidelink and/or a non-3GPP link; and Block 1902: the remote UE communicates with the relay UE based on the selected communication link.

In an embodiment, the remote UE may also measure the sidelink and/or the non-3GPP link.

Figure 20:
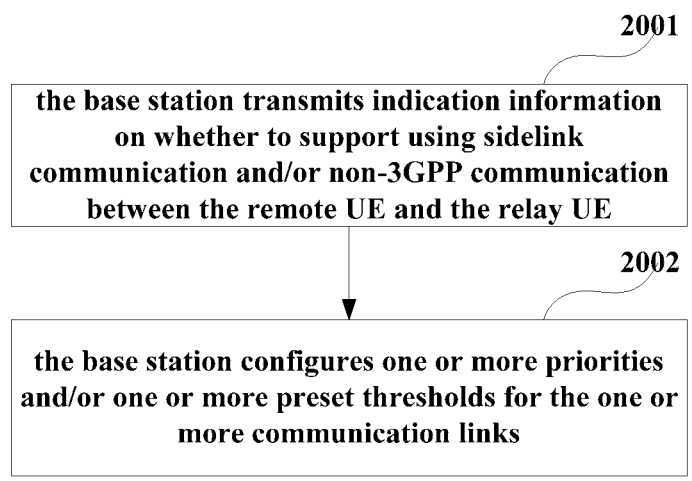
FIG. 20 is another schematic diagram of the information transmission method of Embodiment 7 of this disclosure.

FIG. 20 is another flowchart of the information transmission method of the embodiment of this disclosure, in which a case at a base station side is shown. As shown in FIG. 20, the information transmission method includes:

Block 2001: the base station transmits indication information on whether to support using sidelink communication and/or non-3GPP communication between the remote UE and the relay UE; and Block 2002: the base station configures one or more priorities and/or one or more preset thresholds for the one or more communication links; the communication links include a sidelink and/or a non-3GPP link.

In an embodiment, the base station may indicate via RRC signaling whether sidelink communication, Bluetooth communication and WIFI communication are supported to be used between the remote UE and the relay UE. The base station may configure thresholds for the supported sidelink, Bluetooth link, and/or WIFI link, respectively. And if there are multiple available links, the base station may configure priorities for the multiple available links.

For example, if the side link, the Bluetooth link and the WIFI link are all available, the base station may possibly configure that a priority of the sidelink is the highest, priority of the WIFI link is secondarily high, and priority of the Bluetooth link is the lowest. And the remote UE may perform link selection according to priorities in multiple links having channel quality better than a preset threshold.

Hence, the remote UE may be supported to perform sidelink communication and/or non-3GPP communication with the relay UE.

Figure 21:
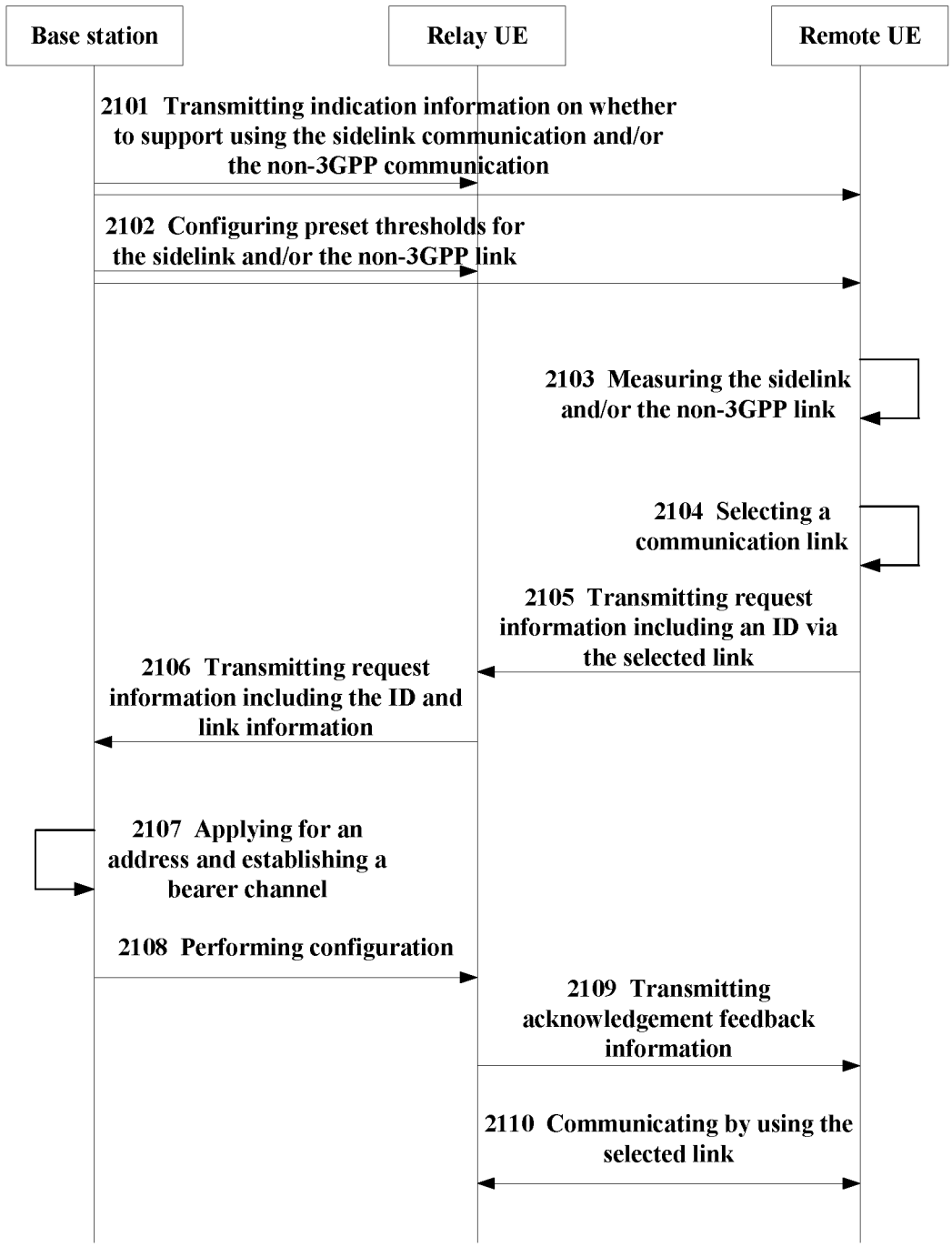
FIG. 21 is a further schematic diagram of the information transmission method of Embodiment 7 of this disclosure.

FIG. 21 is a further schematic diagram of the information transmission method of the embodiment of this disclosure, in which a case of a remote UE, a relay UE and a base station is shown. As shown in FIG. 21, the information transmission method includes:

2101: the base station transmits indication information on whether to support using the sidelink communication and/or the non-3GPP communication between the remote UE and the relay UE;

2102: the base station configures preset thresholds for the sidelink and/or the non-3GPP link.

For example, the base station may configure thresholds respectively for the supported sidelink, Bluetooth link, and/or WIFI link.

2103: the remote UE measures the sidelink and/or the non-3GPP link;

2104: the remote UE selects a communication link communicating with the relay UE from communication links of channel quality higher than the preset threshold according to one or more priorities.

For example, a UE in an idle state may select an optimal link (such as a WIFI link) for communication from communication links of channel quality higher than the preset threshold according to one or more configured priorities.

2105: the remote UE transmits request information including an ID of the remote UE to the relay UE via the selected link.

For example, the remote UE transmits the request information to the relay UE via the WIFI link, the request information including the ID of the remote UE itself, such as a radio network temporary identifier (RNTI), a ProSe UE ID, or an IP address.

2106: the relay UE transmits request information including the ID of the remote UE and link information to the base station when the relay UE receives the request information from the remote UE.

For example, the relay UE transmits the request information including the ID of the remote UE to the base station, and informs the base station of a link (such as a WIFI link) that the remote UE expects to use.

2107: the base station applies for an address for the remote UE and establishes a bearer channel.

For example, after receiving the request information of the relay UE, the base station transmits information to a mobile management entity (MME), applying for the IP address for the remote UE, and establishing the bearer channel.

2108: the base station configures the relay UE.

For example, the base station transmits information including an address of the remote UE to the relay UE.

2109: the relay UE transmits acknowledgement feedback information to the remote UE when the relay UE receives configuration information of the base station.

In addition, the relay UE transmits information including the address of the remote UE to the remote UE.

2110: the remote UE communicates with the relay UE by using the selected link.

For example, the remote UE transmits data to the base station via the relay UE.

It can be seen from the above embodiment that the remote UE communicates with the relay UE based on the autonomously selected communication link. Hence, not only the UE may be made power-saving, for example, the remote UE may perform data transmission with an adjacent relay UE without needing to enlarge power to communicate with a base station; but also continuity of data transmission may be kept, for example, when an air-interface issue occurs, the remote UE may select the non-3GPP technique to perform communication with the relay UE, thereby avoiding a problem of interruption during the transmission.

Embodiment 8

These embodiments of this disclosure provide an information transmission apparatus, which may be configured in a remote UE, with contents identical to those in Embodiment 7 being not going to be described herein any further.

Figure 22:
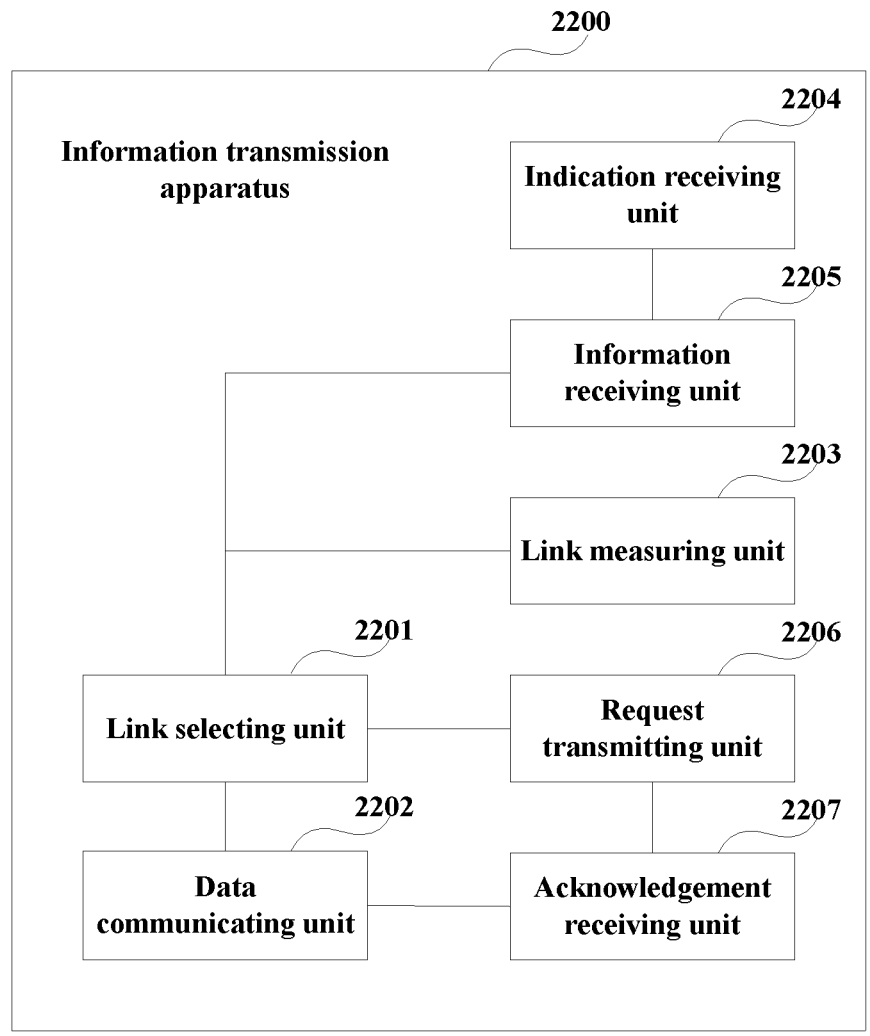
FIG. 22 is a schematic diagram of the information transmission apparatus of Embodiment 8 of this disclosure.

FIG. 22 is a schematic diagram of the information transmission apparatus of the embodiment of this disclosure. As shown in FIG. 22, an information transmission apparatus 2200 includes:

a link selecting unit 2201 configured to select a communication link for performing communication with a relay UE from one or more communication links of channel quality higher than a preset threshold according to one or more priorities; the communication link includes a sidelink and/or a non-3GPP link; and a data communicating unit 2202 configured to communicate with the relay UE based on the selected communication link.

The non-3GPP communication may include Bluetooth communication and/or wireless fidelity (WIFI) communication; however, this disclosure is not limited thereto. And the number of non-3GPP links may be one or more.

As shown in FIG. 22, the information transmission apparatus 2200 may further include:

a link measuring unit 2203 configured to measure a sidelink and/or a non-3GPP link.

As shown in FIG. 22, the information transmission apparatus 2200 may further include:

an indication receiving unit 2204 configured to receive indication information transmitted by the base station on whether it is supported that the sidelink communication and/or the non-3GPP communication is/are used between the remote UE and the relay UE.

As shown in FIG. 22, the information transmission apparatus 2200 may further include:

an information receiving unit 2205 configured to receive one or more priorities and/or one or more preset thresholds configured by the base station for the one or more communication links; priorities and/or thresholds are respectively configured for multiple communication links.

As shown in FIG. 22, the information transmission apparatus 2200 may further include:

a request transmitting unit 2206 configured to transmit request information to the relay UE according to the selected communication link.

In an embodiment, the relay UE transmits information including an ID of the remote UE and link information to the base station after receiving the request information, and the base station applied for an address for the remote UE and establishes a bearer channel, and transmits information including the address of the remote UE to the relay UE.

As shown in FIG. 22, the information transmission apparatus 2200 may further include:

an acknowledgement receiving unit 2207 configured to receive acknowledgement information transmitted by the relay UE, and receive the information including the address of the remote UE.

The embodiment of this disclosure further provides an information transmission apparatus, which may be configured in a base station, with contents identical to those in Embodiment 7 being not going to be described herein any further.

Figure 23:
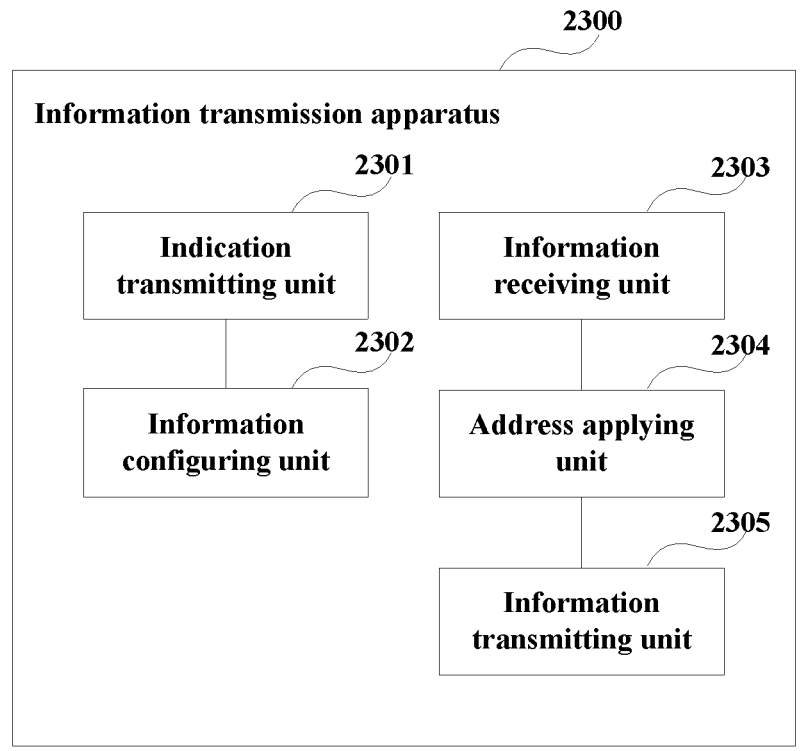
FIG. 23 is another schematic diagram of the information transmission apparatus of Embodiment 8 of this disclosure.

FIG. 23 is a schematic diagram of the information transmission apparatus of the embodiment of this disclosure. As shown in FIG. 23, an information transmission apparatus 2300 includes:

an indication transmitting unit 2301 configured to transmit indication information on whether it is supported that the sidelink communication and/or the non-3GPP communication is/are used between the remote UE and the relay UE; and an information configuring unit 2302 configured to configure one or more priorities and/or one or more preset thresholds for one or more communication links.

As shown in FIG. 23, the information transmission apparatus 2300 may further include:

an information receiving unit 2303 configured to receive information including an ID of the remote UE and link information transmitted by the relay UE.

As shown in FIG. 23, the information transmission apparatus 2300 may further include:

an address applying unit 2304 configured to transmit information to a mobile management entity, applying for an address for the remote UE and establishing a bearer channel; and an information transmitting unit 2305 configured to transmit the information including an ID of the remote UE to the relay UE.

It can be seen from the above embodiment that the remote UE communicates with the relay UE based on the autonomously selected communication link. Hence, not only the UE may be made power-saving, for example, the remote UE may perform data transmission with an adjacent relay UE without needing to enlarge power to communicate with a base station; but also continuity of data transmission may be kept, for example, when an air-interface issue occurs, the remote UE may select the non-3GPP technique to perform communication with the relay UE, thereby avoiding a problem of interruption during the transmission.

Embodiment 9

These embodiments of this disclosure provide a communication system, with contents identical to those in embodiments 1-8 being not going to be described herein any further.

Figure 24:
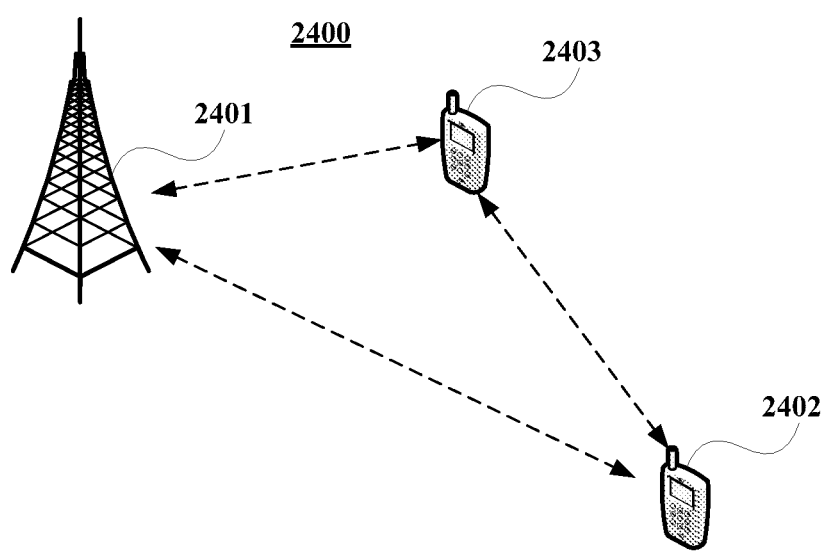
FIG. 24 is a schematic diagram of the communication system of Embodiment 9 of this disclosure.

FIG. 24 is a schematic diagram of the communication system of the embodiment of this disclosure. As shown in FIG. 24, a communication system 2400 may include a base station 2401, a remote UE 2401 and a relay UE 2403.

The remote UE 2402 includes the information transmission apparatus 1500 or 1600 as described in Embodiment 5, or the information transmission apparatus 2200 as described in Embodiment 8, the base station 2401 includes the information transmission apparatus 1700 or 1800 as described in Embodiment 6, or the information transmission apparatus 2300 as described in Embodiment 8.

The embodiment of this disclosure further provides a UE.

Figure 25:
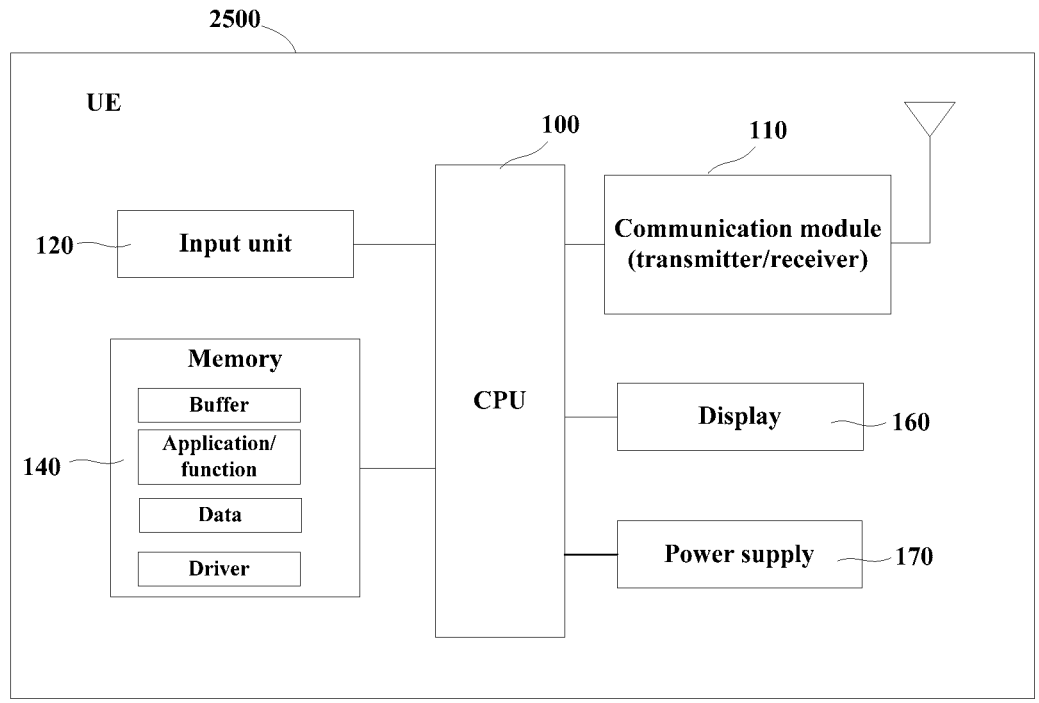
FIG. 25 is a schematic diagram of the UE of Embodiment 9 of this disclosure.

FIG. 25 is a schematic diagram of the UE of the embodiment of this disclosure. As shown in FIG. 25, a UE 2500 may include a central processing unit 100 and a memory 140, the memory 140 being coupled to the central processing unit 100. It should be noted that this figure is illustrative only, and other types of structures may also be used, so as to supplement or replace this structure and achieve a telecommunications function or other functions.

In an embodiment, functions of the information transmission apparatus 1500 or 1600 may be integrated into the central processing unit 100. The central processing unit 100 may be configured to carry out the information transmission method described in embodiments 1-4.

For example, the central processing unit 100 may be configured to perform following control: reporting information including an ID of a relay UE to a base station, the information further indicating that the remote UE supports sidelink communication and/or non-3GPP communication with the relay UE; and performing communication based on a communication link configured by the base station or an autonomously selected communication link.

In another embodiment, functions of the information transmission apparatus 2200 may be integrated into the central processing unit 100. The central processing unit 100 may be configured to carry out the information transmission method described in Embodiment 7.

For example, the central processing unit 100 may be configured to perform following control: selecting a communication link for communicating with a relay UE from one or more communication links of channel quality higher than a preset threshold according to one or priorities; the communication link includes a sidelink and/or a non-3GPP link; and communicating with the relay UE based on the selected communication link.

In a further embodiment, the information transmission apparatus 1500 or 1600 or 2200 and the central processing unit 100 may be configured separately. For example, the information transmission apparatus 1500 or 1600 or 2200 may be configured as a chip connected to the central processing unit 100, with its functions being carried out under control of the central processing unit 100.

As shown in FIG. 25, the UE 2500 may further include a communication module 110, an input unit 120, a display 160 and a power supply 170. Functions of the above components are similar to those in the relevant art, and shall not be described herein any further. It should be noted that the UE 2500 does not necessarily include all the parts shown in FIG. 25, and the above components are not necessary; and furthermore, the UE 2500 may include parts not shown in FIG. 25, and the relevant art may be referred to.

The embodiment of this disclosure further provides a base station.

Figure 26:
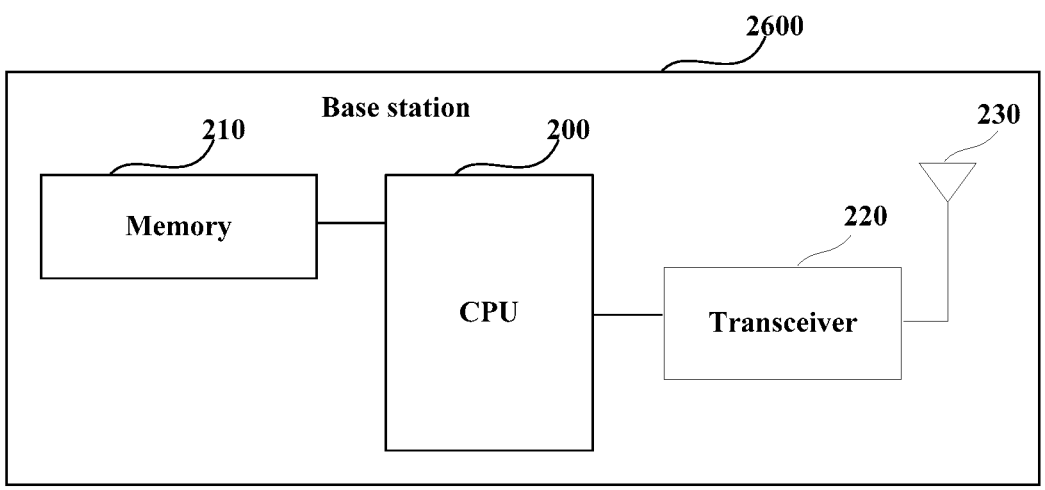
FIG. 26 is a schematic diagram of the base station of Embodiment 9 of this disclosure.

FIG. 26 is a schematic diagram of a structure of the base station in the embodiment of this disclosure. As shown in FIG. 26, a base station 2600 may include a central processing unit (CPU) 200 and a memory 210, the memory 210 being coupled to the central processing unit 200. The memory 210 may store various data, and furthermore, it may store a program for information processing, and execute the program under control of the central processing unit 200.

The central processing unit 200 may be configured to carry out the information transmission method described in embodiments 1-4.

For example, the central processing unit 200 may be configured to perform following control: receiving information including an ID of a relay UE reported by a remote UE, the information further indicating that the remote UE supports sidelink communication and/or non-3GPP communication with the relay UE; and configuring that the remote UE and/or the relay UE use(s) one or more of a sidelink, a non-3GPP link and an air-interface link to communicate.

Furthermore, the central processing unit 200 may be configured to carry out the information transmission method described in Embodiment 7.

For example, the central processing unit 200 may be configured to perform following control: transmitting indication information on whether to support using sidelink communication and/or non-3GPP communication between the remote UE and the relay UE; configuring one or more priorities and/or one or more preset thresholds for the one or more communication links.

Furthermore, as shown in FIG. 26, the base station 2600 may include a transceiver 220, and an antenna 230, etc. Functions of the above components are similar to those in the relevant art, and shall not be described herein any further.

It should be noted that the base station 2600 does not necessarily include all the parts shown in FIG. 26, and furthermore, the base station 2600 may include parts not shown in FIG. 26, and the relevant art may be referred to.

An embodiment of the present disclosure provides a computer readable program, which, when executed in a UE, will cause a computer to carry out the information transmission method described in embodiments 1-4 or Embodiment 7 in the UE.

An embodiment of the present disclosure provides a computer storage medium, including a computer readable program, which will cause a computer to carry out the information transmission method described in embodiments 1-4 or Embodiment 7 in a UE.

An embodiment of the present disclosure provides a computer readable program, which, when executed in a base station, will cause a computer to carry out the information transmission method described in embodiments 1-4 or Embodiment 7 in the base station.

An embodiment of the present disclosure provides a computer storage medium, including a computer readable program, which will cause a computer to carry out the information transmission method described in embodiments 1-4 or Embodiment 7 in a base station.

The above apparatuses of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory.

The method/apparatus described with reference to the embodiments of this disclosure may be directly embodied as hardware, software modules executed by a processor, or a combination thereof. For example, one or more functional block diagrams and/or one or more combinations of the functional block diagrams shown in FIG. 15 may either correspond to software modules of procedures of a computer program, or correspond to hardware modules. Such software modules may respectively correspond to the steps shown in FIG. 5. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the figures may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the figures may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

For implementations of this disclosure containing the above embodiments, following supplements are further disclosed.

Supplement 1. An information transmission apparatus, configured in a remote UE, the information transmission apparatus including:

a link selecting unit configured to select a communication link for performing communication with a relay UE from one or more communication links of channel quality higher than a predetermined threshold according to one or more priorities; wherein, the communication link includes a sidelink and/or a non-3GPP link; and a data communicating unit configured to communicate with the relay UE based on the selected communication link.

Supplement 2. The information transmission apparatus according to supplement 1, wherein the non-3GPP communication includes Bluetooth communication and/or wireless fidelity (WIFI) communication;

and the number of non-3GPP links is one or more.

Supplement 3. The information transmission apparatus according to supplement 1, wherein the information transmission apparatus further includes:

a link measuring unit configured to measure the sidelink and/or the non-3GPP link.

Supplement 4. The information transmission apparatus according to supplement 1, wherein the information transmission apparatus further includes:

an indication receiving unit configured to receive indication information transmitted by the base station on whether it is supported that the sidelink communication and/or the non-3GPP communication is/are used for communication between the remote UE and the relay UE.

Supplement 5. The information transmission apparatus according to supplement 1, wherein the information transmission apparatus further includes:

an information receiving unit configured to receive one or more priorities and/or one or more predetermined thresholds configured by the base station for one or more communication links.

Supplement 6. The information transmission apparatus according to supplement 1, wherein the information transmission apparatus further includes:

a request transmitting unit configured to transmit request information to the relay UE according to the selected communication link.

Supplement 7. The information transmission apparatus according to supplement 6, wherein the relay UE transmits information including an ID of the remote UE and link information to the base station after receiving the request information from the remote UE;

and the base station applied for an address for the remote UE and establishes a bearer channel, and transmits information including the address of the remote UE to the relay UE.

Supplement 8. The information transmission apparatus according to supplement 7, wherein the information transmission apparatus further includes:

an information receiving unit configured to receive acknowledgement information transmitted by the relay UE, and receive the information including the address of the remote UE.

Supplement 9. An information transmission apparatus, configured in a base station, the information transmission apparatus including:

an indication transmitting unit configured to transmit indication information on whether it is supported that the sidelink communication and/or the non-3GPP communication is/are used for communication between a remote UE and a relay UE; and a configuring unit configured to configure one or more communication links with one or more priorities and/or one or more predetermined thresholds.

Supplement 10. The information transmission apparatus according to supplement 9, wherein the information transmission apparatus further includes:

an information receiving unit configured to receive information including an ID of the remote UE and link information transmitted by the relay UE.

Supplement 11. The information transmission apparatus according to supplement 9, wherein the information transmission apparatus further includes:

an address applying unit configured to transmit information to a mobile management entity, applying for an address for the remote UE and establishing a bearer channel; and an information transmitting unit configured to transmit the information including the address of the remote UE to the relay UE.

Supplement 12. A communication system, including:

a remote UE, including the information transmission apparatus as described in supplement 1;

a relay UE configured to communicate with the remote UE; and a base station, including the information transmission apparatus as described in supplement 9.

What is claimed is:

1. An information transmission apparatus, configured in a remote user equipment (UE) of a cellular communication system that supports sidelink communication, the information transmission apparatus comprising:

an information reporting processor circuitry configured to report information comprising an identifier (ID) of a relay UE to a base station, the information further indicating that the remote UE supports sidelink communication of the cellular communication system and other communication that is different from the cellular communication system with the relay UE; and a data communication processor circuitry configured to perform communication with the relay UE based on the sidelink communication of the cellular communication system or the other communication that is different from the cellular communication system selected by the remote UE or the relay UE.

2. The information transmission apparatus according to claim 1, wherein the other communication that is different from the cellular communication system comprises one or both of Bluetooth communication and wireless fidelity (WIFI) communication.

3. The information transmission apparatus according to claim 1, wherein the information transmission apparatus further comprises:

a link measuring processor circuitry configured to measure the sidelink and/or (a) link(s) of the other communication that is different from the cellular communication system;

and the information reporting unit is further configured to report one or more measurement results of the sidelink and/or the link(s) of the other communication that is different from the cellular communication system.

4. The information transmission apparatus according to claim 1, wherein the information transmission apparatus further comprises:

an indication receiver configured to receive indication information transmitted by the base station on whether sidelink communication of the cellular communication system and/or the other communication that is different from the cellular communication system is/are used for communication between the remote UE and the relay UE.

5. The information transmission apparatus according to claim 4, wherein the information transmission apparatus further comprises:

a resource receiver configured to receive one or more resources used for an exceptional case broadcasted by the base station, and configured to use the sidelink communication of the cellular communication system and/or the other communication that is different from the cellular communication system for the exceptional case.

6. The information transmission apparatus according to claim 1, wherein the information transmission apparatus further comprises:

an acknowledging processor circuitry configured to acknowledge to the base station using the other communication that is different from the cellular communication system according to configuration information transmitted by the base station when the remote UE selected the other communication that is different from the cellular communication system;

and the data communication processor circuitry is further configured to communicate with the relay UE by using the other communication that is different from the cellular communication system.

7. The information transmission apparatus according to claim 6, wherein the remote UE is configured to transmit request information comprising an ID of the remote UE to the relay UE via the other communication that is different from the cellular communication system;

and the relay UE is configured to transmit a request comprising the ID of the remote UE and information on the link(s) of the other communication that is different from the cellular communication system to the base station when the relay UE receives the request information, and transmit acknowledgement feedback information to the remote UE.

8. The information transmission apparatus according to claim 1, wherein the information transmission apparatus further comprises:

a selector configured to select a sidelink, when the remote UE is using the other communication that is different from the cellular communication system to communicate with the relay UE and channel quality of the link(s)

of the other communication that is different from the cellular communication system is lower than a first predetermined threshold and channel quality of the sidelink is higher than a second predetermined threshold;

and the data communication unit is further configured to communicate with the relay UE by using the sidelink.

9. The information transmission apparatus according to claim 1, wherein the information transmission apparatus further comprises:

a resource requesting processor circuitry configured to make the remote UE enter into a connected state and request the base station for one or more resources, when the remote UE is using the other communication that is different from the cellular communication system to communicate with the relay UE and channel quality of the link(s) of the other communication that is different from the cellular communication system is lower than a first predetermined threshold and channel quality of the sidelink is lower than or equal to a second predetermined threshold;

and the data communication processor circuitry is further configured to communicate by using the other communication that is different from the cellular communication system according to the resources transmitted by the base station.

10. The information transmission apparatus according to claim 1, wherein the information transmission apparatus further comprises:

a link requesting processor circuitry configured to request the base station to change a communication link, when the remote UE is using the other communication that is different from the cellular communication system to communicate with the relay UE and channel quality of the link(s) of the other communication that is different from the cellular communication system is lower than a third predetermined threshold and the remote UE is in a connected state;

and the data communication processor circuitry is further configured to communicate by using a sidelink or the other communication that is different from the cellular communication system according to configuration information transmitted by the base station.

11. The information transmission apparatus according to claim 1, wherein the information transmission apparatus further comprises:

a selector configured to select the other communication that is different from the cellular communication system, when the remote UE is using a sidelink to communicate with the relay UE and channel quality of the sidelink is lower than a fourth predetermined threshold and the channel quality of the link(s) of the other communication that is different from the cellular communication system is higher than a fifth predetermined threshold;

and the data communication processor circuitry is further configured to communicate with the relay UE by using the other communication that is different from the cellular communication system.

12. The information transmission apparatus according to claim 1, wherein the information transmission apparatus further comprises:

a resource requesting processor circuitry configured to make the remote UE enter into a connected state and request the base station for one or more resources, when the remote UE is using a sidelink to communicate with the relay UE and channel quality of the sidelink is lower than a fourth predetermined threshold and the channel quality of the link(s) of the other communication that is different from the cellular communication system is lower than or equal to a fifth predetermined threshold;

and the data communication processor circuitry is further configured to communicate by using the other communication that is different from the cellular communication system according to resources transmitted by the base station.

13. The information transmission apparatus according to claim 1, wherein the information transmission apparatus further comprises:

a link requesting processor circuitry configured to request the base station to change a communication link, when the remote UE is using a sidelink to communicate with the relay UE and channel quality of the sidelink is lower than a sixth predetermined threshold and the remote UE is in a connected state;

and the data communication processor circuitry is further configured to communicate by using the other communication that is different from the cellular communication system according to configuration information transmitted by the base station.

14. An information transmission apparatus, configured in a base station of a cellular communication system that supports sidelink communication, the information transmission apparatus comprising:

an information receiver unit configured to receive information comprising an ID of a relay UE reported by a remote UE, the information further indicating that the remote UE supports sidelink communication of the cellular communication system and the other communication that is different from the cellular communication system with the relay UE; and a link configuring processor circuitry configured to configure that the remote UE and/or the relay UE use(s) one or more of a sidelink, the other communication that is different from the cellular communication system to communicate.

15. The information transmission apparatus according to claim 14, wherein the information transmission apparatus further comprises:

an indication transmitter configured to transmit indication information on whether it is supported that the sidelink communication of the cellular communication system and/or the other communication that is different from the cellular communication system is/are used for communication between the remote UE and the relay UE.

16. The information transmission apparatus according to claim 14, wherein the information transmission apparatus further comprises:

a resource broadcasting processor circuitry configured to broadcast one or more resources used for an exceptional case, and configured to use the sidelink communication of the cellular communication system and/or the other communication that is different from the cellular communication system for the exceptional case.

17. The information transmission apparatus according to claim 14, wherein the information transmission apparatus further comprises:

a selector configured to select the other communication that is different from the cellular communication system for the remote UE to communicate with the relay UE;

or select a sidelink or the other communication that is different from the cellular communication system for the remote UE to communicate when receiving a request for changing a communication link transmitted by the remote UE in a connected state using the other communication that is different from the cellular communication system to communicate;

or select the communication that is different from the cellular communication system when receiving a request for changing a communication link transmitted by the remote UE in a connected state using the sidelink to communicate.

18. The information transmission apparatus according to claim 14, wherein the information transmission apparatus further comprises:
a resource transmitter configured to transmit one or more resources to the remote UE when receiving a request for resource transmitted by the remote UE in an idle state.

19. The information transmission apparatus according to claim 14, wherein the information transmission apparatus further comprises:
a threshold configuring processor circuitry configured to configure each link of the other communication that is different from the cellular communication system with one or more predetermined thresholds, and configure each sidelink with at least one predetermined threshold.

20. A communication system, comprising:
a remote UE of a cellular communication system that supports sidelink communication, which comprises:
an information reporting processor circuitry configured to report information comprising an identifier (ID) of a relay UE to a base station, the information further indicating that the remote UE supports sidelink communication of the cellular communication system and other communication that is different from the cellular communication system with the relay UE, and a data communication processor circuitry configured to perform communication with the relay UE based on the sidelink communication of the cellular communication system or the other communication that is different from the cellular communication system selected by the remote UE or the relay UE;

the relay UE is configured to communicate with the remote UE; and the base station of a cellular communication system that supports sidelink communication, which comprises:
an information receiver configured to receive information comprising an ID of the relay UE reported by the remote UE, the information further indicating that the remote UE supports sidelink communication of the cellular communication system and other communication that is different from the cellular communication system with the relay UE, and a link configuring processor circuitry configured to configure that the remote UE and/or the relay UE use(s) one or more of a sidelink, the other communication that is different from the cellular communication system and an air-interface link to communicate.

* * * * *